US011665299B2

United States Patent
Utsunomiya

(10) Patent No.: US 11,665,299 B2
(45) Date of Patent: May 30, 2023

(54) COMMUNICATION SYSTEM, INFORMATION PROCESSING METHOD, AND NON-TRANSITORY RECORDING MEDIUM

(71) Applicant: Shohhei Utsunomiya, Kanagawa (JP)

(72) Inventor: Shohhei Utsunomiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/654,105

(22) Filed: Mar. 9, 2022

(65) Prior Publication Data
US 2022/0303423 A1 Sep. 22, 2022

(30) Foreign Application Priority Data
Mar. 22, 2021 (JP) ............................. JP2021-047237

(51) Int. Cl.
*H04N 1/00* (2006.01)
*H04N 1/32* (2006.01)

(52) U.S. Cl.
CPC ....... *H04N 1/00973* (2013.01); *H04N 1/0048* (2013.01); *H04N 1/00204* (2013.01); *H04N 1/00408* (2013.01)

(58) Field of Classification Search
None
See application file for complete search history.

(56) References Cited

U.S. PATENT DOCUMENTS

2011/0067023 A1* 3/2011 Chiyo ................ H04N 1/00222
717/177
2012/0209974 A1* 8/2012 Igarashi ................ H04L 41/046
709/223

(Continued)

FOREIGN PATENT DOCUMENTS

JP 2010-166382 7/2010
JP 2015-055927 3/2015
(Continued)

*Primary Examiner* — Beniyam Menberu
(74) *Attorney, Agent, or Firm* — IPUSA, PLLC

(57) ABSTRACT

A communication system includes an information processing apparatus, a plurality of devices, and a communication management apparatus to communicate with the information processing apparatus and each of the plurality of devices. The information processing apparatus includes first circuitry to receive registerable device information transmitted by the communication management apparatus, the registrable device information indicating one or more registerable devices, among the plurality of devices, in which a particular application and particular settings are registrable, and transmit, to the communication management apparatus, registration setting information for registering the particular application and the particular settings, the registration setting information being set for a particular group of a plurality of groups based on the registerable device information. Each of the one or more devices includes second circuitry to receive the registration setting information from the communication management apparatus and register the particular application and the particular settings based on the registration setting information.

9 Claims, 20 Drawing Sheets

(56) References Cited

U.S. PATENT DOCUMENTS

| | | | | |
|---|---|---|---|---|
| 2013/0063782 A1* | 3/2013 | Numata | ............... | G06K 15/02 |
| | | | | 358/1.15 |
| 2013/0332546 A1* | 12/2013 | Miyazawa | ............. | H04L 51/48 |
| | | | | 709/206 |
| 2014/0016165 A1* | 1/2014 | Ando | ................. | H04N 1/4433 |
| | | | | 358/403 |
| 2014/0129607 A1* | 5/2014 | Nagumo | ........... | H04L 41/5048 |
| | | | | 709/201 |
| 2015/0074821 A1 | 3/2015 | Hoshi | | |
| 2017/0161048 A1* | 6/2017 | Araki | ...................... | G06F 8/61 |
| 2018/0109688 A1* | 4/2018 | Uchibori | ............. | H04L 63/104 |
| 2020/0133591 A1* | 4/2020 | Kaneda | ................. | G06F 3/122 |
| 2021/0321009 A1* | 10/2021 | Sato | ................ | H04N 1/00952 |

FOREIGN PATENT DOCUMENTS

| | | | | |
|---|---|---|---|---|
| JP | 2017-083934 | | 5/2017 | |
| JP | 6170624 | * | 7/2017 | ............. G06F 3/12 |
| JP | 2017-134472 | | 8/2017 | |
| JP | 2020184801 | * | 11/2020 | ............. H04N 1/00 |

* cited by examiner

FIG. 5A

| GROUP IDENTIFIER | GROUP NAME | APPLICATION IDENTIFIER | SETTING IDENTIFIER | DEFAULT GROUP FLAG |
|---|---|---|---|---|
| G001 | GROUP A | AID001 | SID001 | TRUE |
| G001 | GROUP A | AID002 | SID001 | TRUE |
| G002 | GROUP B | AID004 | SID001 | FALSE |
| G002 | GROUP B | AID004 | SID002 | FALSE |
| G002 | GROUP B | AID005 | SID001 | FALSE |
| G002 | GROUP B | AID005 | SID002 | FALSE |
| G003 | GROUP C | AID004 | — | FALSE |
| G004 | GROUP FOR MFP | AID003 | SID003 | FALSE |
| G004 | GROUP FOR MFP | AID003 | SID003 | FALSE |
| G004 | GROUP FOR MFP | AID003 | SID003 | FALSE |
| G004 | GROUP FOR MFP | AID003 | SID003 | FALSE |
| ... | ... | ... | ... | ... |

FIG. 5B

| APPLICATION IDENTIFIER | APPLICATION NAME | APPLICABLE DEVICE TYPE |
|---|---|---|
| AID001 | APPLICATION A | - |
| AID002 | APPLICATION B | - |
| AID003 | APPLICATION A FOR MFP | MFP |
| AID004 | APPLICATION C | - |
| AID005 | APPLICATION D | - |
| ... | ... | .. |

FIG. 5C

| SETTING IDENTIFIER | SETTING NAME | APPLICABLE DEVICE TYPE | INPUT PARAMETER |
|---|---|---|---|
| SID001 | PROXY SETTING | - | ADDRESS, PORT |
| SID002 | FIRMWARE AUTOMATIC UPDATE TIME SETTING | - | UPDATE TIME |
| SID003 | MFP DEDICATED SETTING A | MFP | SETTING A, SETTING B |
| ... | ... | ... | ... |

FIG. 5D

| DEVICE IDENTIFIER | SERIAL NUMBER | MAC ADDRESS | DEVICE TYPE |
|---|---|---|---|
| MID001 | DM-FTFTaaaa | 32:61:3C:4E:B6:05 | MFP |
| MID002 | DM-FTFTbbbb | 32:31:DE:AD:BE:EF | MFP |
| MID003 | DM-FTFTcccc | 32:32:89:AB:CD:EF | MFP |
| MID004 | DM-FTFTdddd | 32:71:00:11:22:33 | MFP |
| ... | ... | ... | ... |

FIG. 5E

| DEVICE IDENTIFIER | TENANT IDENTIFIER | REGISTRATION STATE |
|---|---|---|
| MID001 | T00001 | REGISTERED |
| MID002 | T00001 | REGISTERED |
| MID003 | T00002 | UNREGISTERED |
| MID004 | T00003 | TEMPORARILY REGISTERED |
| ... | ... | ... |

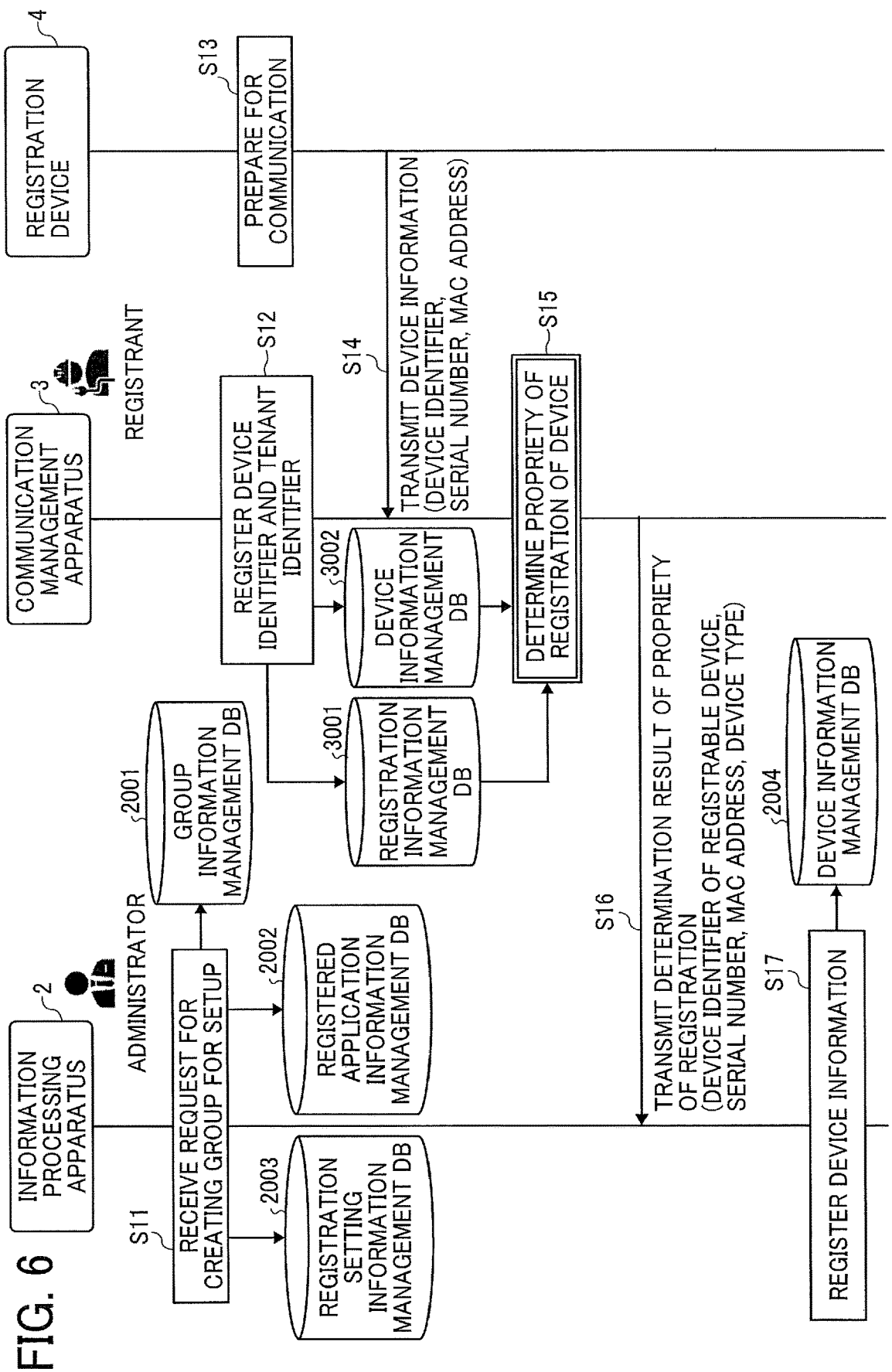

COMMUNICATION SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-047237, filed on Mar. 22, 2021, in the Japan Patent Office, the entire disclosure of which is hereby incorporated by reference herein.

BACKGROUND

Technical Field

The present disclosure relates to a communication system, an information processing method, and a non-transitory recording medium.

Related Art

There are apparatuses such as a multifunction peripheral having a plurality of functions and connected to a network. Conventionally, a technique has been known that enables addition and deletion of new application software (an application) to and from such an apparatus after installation of the apparatus at a site.

SUMMARY

In one aspect, a communication system includes an information processing apparatus, a plurality of devices, and a communication management apparatus configured to communicate with the information processing apparatus and each of the plurality of devices. The information processing apparatus includes first circuitry to receive registerable device information transmitted by the communication management apparatus, the registrable device information indicating one or more registerable devices, among the plurality of devices, in which a particular application and particular settings are registrable, and transmit, to the communication management apparatus, registration setting information to be used for registering the particular application and the particular settings, the registration setting information being set for a particular group of a plurality of groups based on the registerable device information. Each of the one or more devices includes second circuitry to receive the registration setting information from the communication management apparatus and register the particular application and the particular settings based on the registration setting information.

In another aspect, an information processing method for registering a particular application in a plurality of devices, the method includes receiving registrable device information being transmitted by a communication management apparatus that communicates with the plurality of devices, the registrable device information indicating one or more registrable devices, among the plurality of devices, in which a particular application and particular settings are registrable; and transmitting registration setting information set for a particular group of a plurality of groups based on the registrable device information, the registration setting information to be used by the plurality of registrable devices to perform registration of the particular application and the particular settings.

In another aspect, a non-transitory recording medium is provided, which stores a plurality of program codes which, when executed by one or more processors, causes the processors to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is a table illustrating an example of a group information management table according to one embodiment;

FIG. 5B is a table illustrating an example of a registered application information management table according to one embodiment;

FIG. 5C is a table illustrating an example of a registration setting information management table according to one embodiment;

FIG. 5D is a table illustrating an example of a device information management table according to one embodiment;

FIG. 5E is a table illustrating an example of a registration information management table according to one embodiment;

FIG. 6 is a sequence chart illustrating an example of a part of setup processing according to one embodiment;

Figure 1:
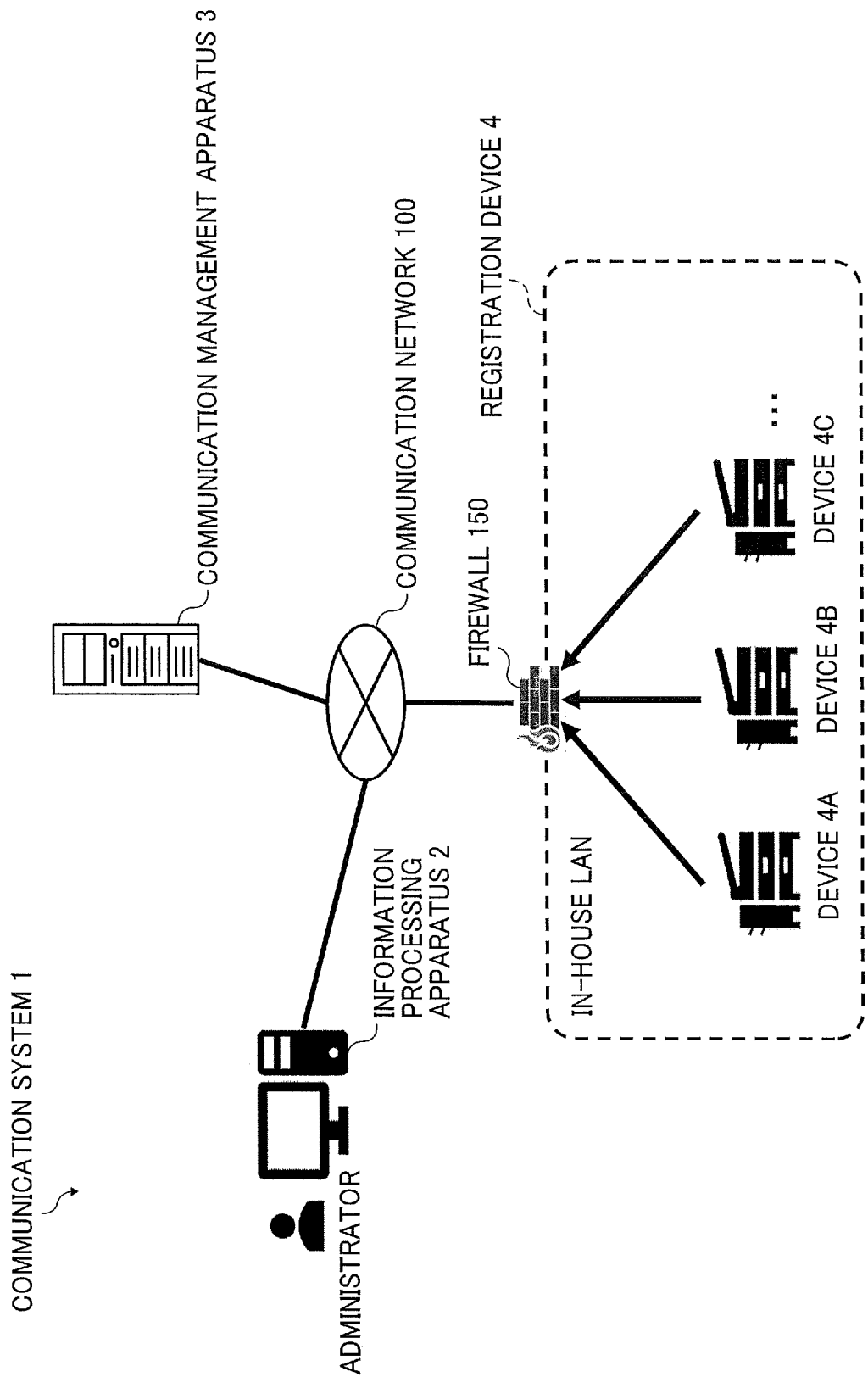
FIG. 1 is a diagram illustrating an example of an overall configuration of a communication system according to one embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings. In the description of the drawings, the same elements are denoted by the same reference numerals, and redundant descriptions thereof are omitted.

First Embodiment

Referring now to FIGS. 1 to 18, a description is given of a first embodiment of the present disclosure.

Overall Configuration of Communication System

FIG. 1 is a diagram illustrating an example of an overall configuration of a communication system according to the present embodiment. As illustrated in FIG. 1, a communication system 1 includes an information processing apparatus 2, a communication management apparatus 3, and one or more devices (4A, 4B, and 4C in FIG. 1). For the devices 4, various types of settings (setup) are performed by an administrator (or a user) who manages the information processing apparatus 2. The devices 4 are hereinafter referred to as the registration devices 4). The information processing apparatus 2 and the communication management apparatus 3 are connected to each other via a communication network 100. The communication network 100 is implemented by, for example, the Internet, a mobile communication network, a local area network (LAN), or the like. The communication network 100 may include, in addition to a wired communication, a wireless communication in compliance with, for example, the third generation (3G), the fourth generation (4G), the fifth generation (5G), Worldwide Interoperability for Microwave Access (WiMAX), or Long Term Evolution (LTE). A firewall 150 exists between the communication network 100 and the one or more registration devices 4, and the registration devices 4 are located in an in-house LAN inside of the firewall 150. The registration device 4A, 4B, and 4C are examples of the registration devices 4 located in the in-house LAN and may be, for example, a multifunction peripheral/printer/product (MFP) which is an example of an image forming apparatus, an interactive whiteboard (IWB; an electronic whiteboard having a blackboard function capable of mutual communication), a projector, a video (web) conference system, or the like. For each of the registration devices 4A, 4B, and 4C, various types of processing for setup are performed by an administrator (or a user) who manages the information processing apparatus 2. The registration device 4 is not limited to the above-described devices such as the MFP and may be any electronic devices for which the various types of processing for setup are performed. Note that the inside of the firewall 150 means a local environment protected by the firewall 150 from access via the communication network 100.

Information Processing Apparatus

The information processing apparatus 2 is implemented by an information processing apparatus (computer system) installed with a general-purpose operating system (OS) and having a server function. The information processing apparatus 2 communicates with the communication management apparatus 3 via the communication network 100 and shares various data (information) with the communication management apparatus 3. In addition, the information processing apparatus 2 communicates with the registration devices 4 via the communication network 100 and the firewall 150, and shares various data (information) with the registration devices 4. Note that the information processing apparatus 2 may be a general-purpose personal computer (PC). Further, any communication terminal capable of executing software such as browser software may be used as the information processing apparatus 2.

Communication Management Apparatus

The communication management apparatus 3 is implemented by one or more information processing apparatuses (computer system) installed with a general-purpose OS and having a server function. The communication management apparatus 3 communicates with the information processing apparatus 2 via the communication network 100 and shares various data (information) with the information processing apparatus 2. In addition, the communication management apparatus 3 communicates with the registration devices 4 via the communication and the firewall 150, and shares various data (information) with the registration devices 4. Note that the communication management apparatus 3 may be a general-purpose personal computer (PC). Further, any communication terminal capable of executing software such as browser software may be used as the communication management apparatus 3. Some or all of the functions of the information processing apparatus 2 may be implemented by the communication management apparatus 3.

Registration Device

The registration device 4 is one or more multifunction peripherals/printers/products (MFPs) which are examples of an image forming apparatus, an IWB, a projector, a video (web) conference system, or the like. The registration device 4 communicates with the information processing apparatus 2 and the communication management apparatus 3 via the firewall 150 and the communication network 100. In addition, the registration device 4 performs registration (setup) of a particular application and a setting based on registration setting information transmitted by the information processing apparatus 2.

Terms

In the present embodiment, the term "introduction (to introduce)" means bringing software or hardware into a state actually usable. The term "introduction (to introduce)" also means writing setting information of software or hardware. For example, the setting information may be written and stored in a nonvolatile memory included in the image forming apparatus. The term "introduction (to introduce)" may be described using terms "registration (to register)" or "setup (to set up)." The application as an example of software may include a native application to be installed on the image forming apparatus to provide a specific function and a web application to provide a specific function in cooperation with an external server. In particular, with respect to software, the terms "introduction (to introduce)" and "registration (to register)" are processing for making the software usable by the image forming apparatus, and "installation (to install)" is an example of introduction and registration.

Hardware Configuration

Figure 2:
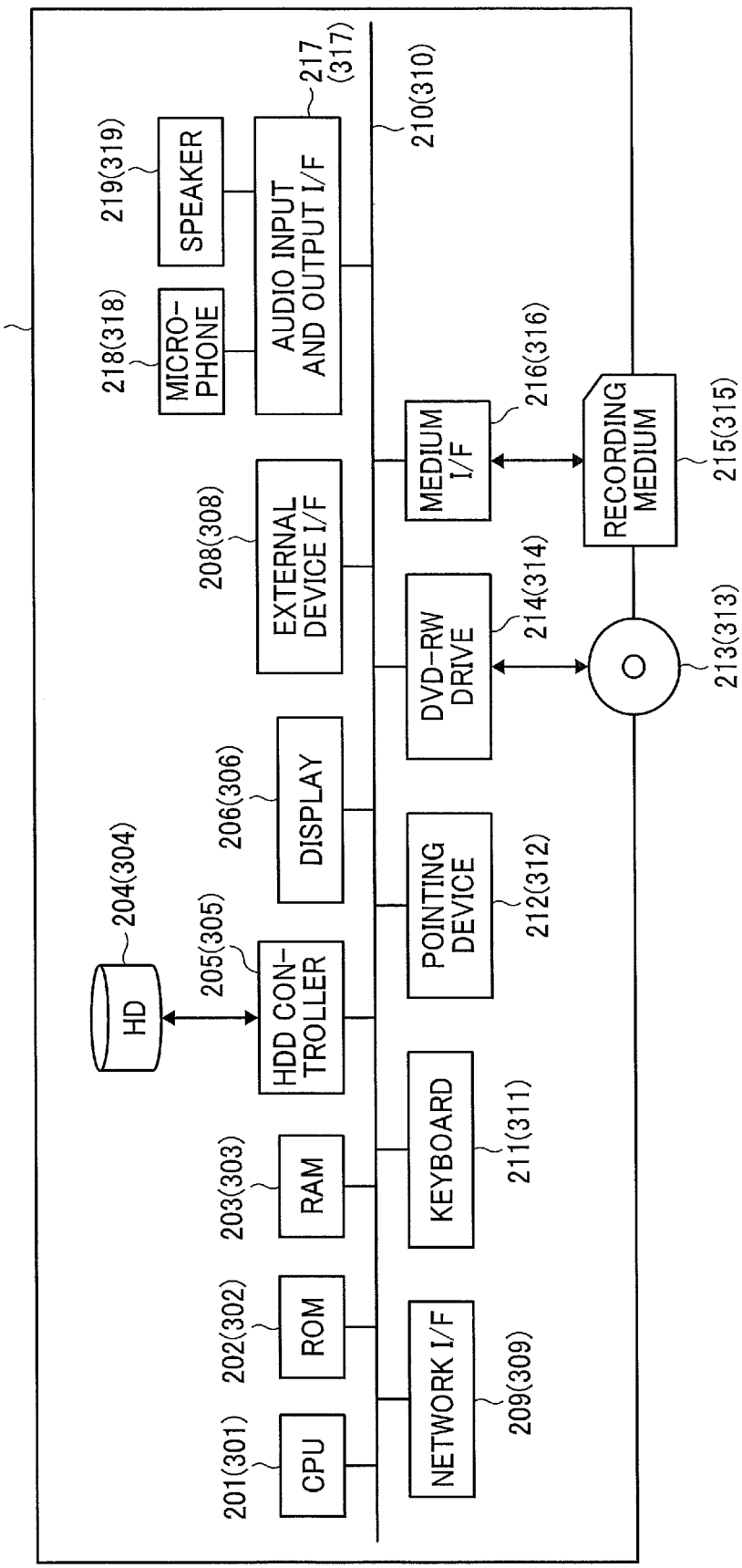
FIG. 2 is a block diagram illustrating an example of a hardware configuration of an information processing apparatus and a communication management apparatus according to one embodiment.

Hardware Configuration of Information Processing Apparatus and Communication Management Apparatus FIG. 2 is a block diagram illustrating an example of a hardware configuration of the information processing apparatus and the communication management apparatus according to the present embodiment. As illustrated in FIG. 2, the information processing apparatus 2 is implemented by a computer and includes hardware resources including a central processing unit (CPU) 201, a read only memory (ROM) 202, a random access memory (RAM) 203, a hard disk (HD) 204, a hard disk drive (HDD) controller 205, a display 206, an external device interface (I/F) 208, a network I/F 209, a keyboard 211, a pointing device 212, a digital versatile disc rewritable (DVD-RW) drive 214, a medium I/F 216, an audio input and output I/F 217, a microphone 218, and a speaker 219. All the above-described devices are connected to one another via a bus line 210.

The CPU 201 controls entire operation of the information processing apparatus 2. The ROM 202 stores a program to boot the CPU 201. The RAM 203 is used as a work area for the CPU 201. The HD 204 stores various data such as a control program. The HDD controller 205 controls reading and writing of various data from and to the HD 204 under control of the CPU 201. The display 206 displays various types of information such as a cursor, a menu, a window, characters, and an image. The display 206 may be a touch panel display provided with an input unit. The external device I/F 208 is an interface for connection with various external devices. Examples of the external devices include, but are not limited, a universal serial bus (USB) memory and a USB device. The network I/F 209 is an interface for data communication through the communication network 100. The bus line 210 is, for example, an address bus or a data bus, which electrically connects each component illustrated in FIG. 2, such as the CPU 201.

The keyboard 211 is an example of an input device provided with a plurality of keys that allows a user to input characters, numerals, and various instructions. The pointing device 212 is an example of an input device that allows a user to select or execute various instructions, select an object for processing, and move a cursor being displayed. Note that the input device is not limited to the keyboard 211 or the pointing device 212, and may be a touch panel, a voice input device, or the like. The DVD-RW drive 214 controls reading and writing of various data from and to a DVD-RW 213, which is an example of a removable storage medium. The removable storage medium is not limited to a DVD-RW and may be a digital versatile disk recordable (DVD-R), a BLU-RAY disc, or the like. The medium I/F 216 controls reading and writing (storing) of data from and to a recording medium 215 such as a flash memory. The microphone 218 is an example of a built-in sound collecting device for inputting audio (audio signal). The speaker 219 is an example of a sound output device for outputting audio (audio signal). The audio input and output I/F 217 is a circuit that processes an input and an output of an audio signal between the microphone 218 and the speaker 219 under control of the CPU 201.

As illustrated in FIG. 2, the communication management apparatus 3 is implemented by a computer and includes hardware resources including a CPU 301, a ROM 302, a RAM 303, an HD 304, an HDD controller 305, a display 306, an external device I/F 308, a network I/F 309, a keyboard 311, a pointing device 312, a DVD-RW drive 314, a medium I/F 316, an audio input and output I/F 317, a microphone 318, and a speaker 319. All the above-described devices are connected to one another via a bus line 310. These hardware resources of the communication management apparatus 3 are the same or substantially the same as the hardware resources of the information processing apparatus 2, and the redundant detailed descriptions thereof are omitted below.

Note that programs executed by the information processing apparatus 2 or the communication management apparatus 2 may be recorded in a file in a format installable or executable on a computer-readable recording medium or be downloaded through a network for distribution. Examples of the recording medium include a compact disc recordable (CD-R), a digital versatile disc (DVD), a BLU-RAY disc, a secure digital (SD) card, and a USB memory. In addition, the recording medium may be domestically or internationally provided as a program product. For example, the information processing apparatus 2 implements an information processing method according to the present disclosure by executing a program according to the present disclosure.

Hardware Configuration of Registration Device

Figure 3:
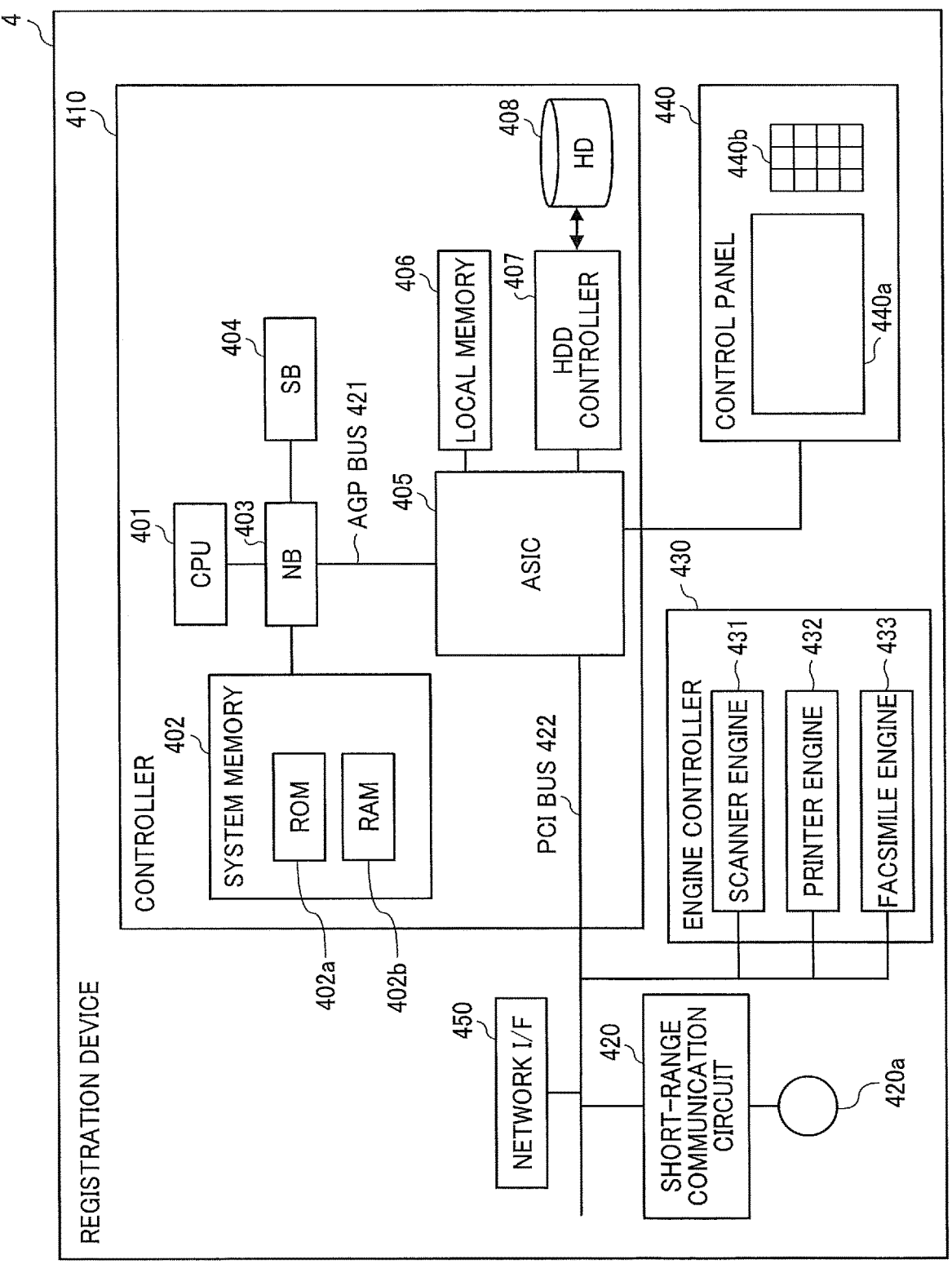
FIG. 3 is a block diagram illustrating an example of a hardware configuration of a registration device according to one embodiment.

FIG. 3 is a block diagram illustrating an example of a hardware configuration of a registration device according to the present embodiment. The registration device 4 is, for example, an MFP, and includes hardware resources including a controller 410, a short-range communication circuit 420, an engine controller 430, a control panel 440, and a network I/F 450 as illustrated in FIG. 3.

The controller 410 includes a CPU 401 as a main processor, a system memory 402, a north bridge (NB) 403, a south bridge (SB) 404, an application specific integrated circuit (ASIC) 405, a local memory 406 as a storage area, an HDD controller 407, and an HD 408 as a storage area. The NB 403 and the ASIC 405 are connected via an accelerated graphics port (AGP) bus 421.

The CPU 401 controls entire operation of the registration device 4. The NB 403 is a bridge for connecting the CPU 401 with the system memory 402, the SB 404, and the AGP bus 421. The NB 403 includes a memory controller for controlling reading and writing of various data from and to the system memory 402, a peripheral component interconnect (PCI) master, and an AGP target.

The system memory 402 includes a ROM 402a as a memory that stores a program and data for implementing various functions of the controller 410. The system memory 402 further includes a RAM 402b used as a memory to load the program and the data, or as a drawing memory that stores drawing data for printing. The program stored in the RAM 402b may be stored in any computer-readable recording medium, such as a compact disc read only memory (CD-ROM), a CD-R, or a DVD, in a file format installable or executable by a computer, for distribution.

The SB 404 is a bridge for connecting the NB 403 to PCI devices and peripheral devices. The ASIC 405 is an integrated circuit (IC) for image processing applications including hardware elements for image processing and has a role of a bridge connecting the AGP bus 421, a PCI bus 422, the HD 408, and the local memory 406 one another. The ASIC 405 includes a PCI target, an AGP master, an arbiter, a memory controller to control the local memory 406, a plurality of direct memory access controllers (DMACs), and a PCI unit. The arbiter arbitrates a drive timing of individual signal according to a fixed priority in the ASIC 405. The DMACs rotate image data by converting coordinates of the image data with, for example, a hardware logic. The PCI unit transfers data between a scanner engine 431 and a printer engine 432 via the PCI bus 422. The ASIC 405 can be configured to connect to a USB interface, the Institute of Electrical and Electronics Engineers 1394 (IEEE1394) interface, or both.

The local memory 406 is a memory used as a buffer for image data to be copied or a code buffer. The HD 408 is a storage for storing image data, font data used during printing, and forms. The HDD controller 407 controls reading and writing of data from and to the HD 408 under control of the CPU 401. The AGP bus 421 is a bus interface for a graphics accelerator card, which has been proposed to accelerate graphics processing. Through directly accessing the system memory 402 by high-throughput, speed of the graphics accelerator card is improved.

The short-range communication circuit 420 includes a short-range communication antenna 420a. The short-range communication circuit 420 is a communication circuit using a short-range wireless communication technology in compliance with the near field communication (NFC), BLUETOOTH, WIRELESS FIDELITY (WI-FI), or the like.

The engine controller 430 includes the scanner engine 431, the printer engine 432, and a facsimile engine 433. The control panel 440 includes a panel display 440a and an operation panel 440b. The panel display 440a is, for example, a touch panel that displays current settings or a selection screen and receives a user input. The operation panel 440b includes, for example, a numeric keypad and a start key. The numeric keypad receives assigned values of image forming parameters such as an image density parameter. The start key receives an instruction to start copying, for example. The controller 410 controls entire operation of the registration device 4. For example, the controller 410 controls rendering, communication, or user inputs to the control panel 440. The scanner engine 431 and the printer engine 432 each perform various image processing, such as error diffusion or gamma conversion. The facsimile engine 433 includes an analog I/F for performing facsimile communication using an analog line (a public network) connected to the information processing apparatus 2, a modem, a speaker, or the like.

Note that, in response to an instruction to select a specific application through the control panel 440 by use of, for example, an application (or mode) switch key, the registration device 4 selectively performs document server function, copying function, printing function, and facsimile communication function. When the document server function is selected, an operation mode switches to a document box mode. With selection of the copying function, the operation mode switches to a copy mode. With selection of the printing function, the operation mode switches to a printer mode. With selection of the facsimile communication function, the operation mode switches to a facsimile mode.

The network I/F 450 is an interface for data communication through the communication network 100. The short-range communication circuit 420 and the network I/F 450 are electrically connected to the ASIC 405 via the PCI bus 422. Note that the registration device 4 is not limited to an MFP, and as described above, may be an IWB, a projector, a video (web) conference system, or the like, each of which may have a unique hardware configuration.

Functional Configuration of Communication System

Figure 4:
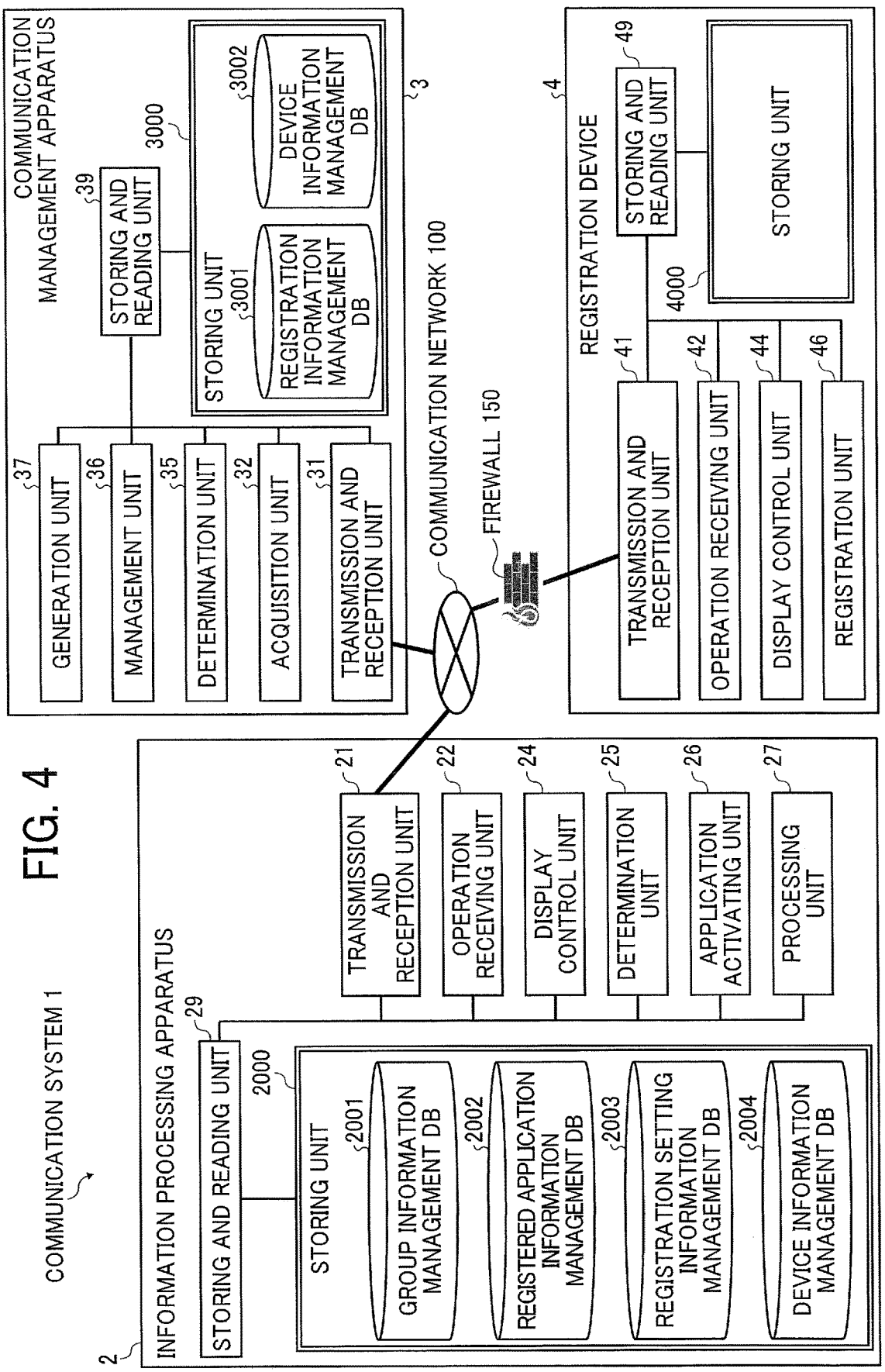
FIG. 4 is a block diagram illustrating an example of a functional configuration of a communication system according to one embodiment.

Referring now to FIGS. 4 to 5E, a description is given of a functional configuration of the communication system according to the first embodiment. FIG. 4 is a block diagram illustrating an example of a functional configuration of the communication system according to the present embodiment.

Functional Configuration of Information Processing Apparatus

As illustrated in FIG. 4, the information processing apparatus 2 includes a transmission and reception unit 21, an operation receiving unit 22, a display control unit 24, a determination unit 25, an application activating unit 26, a processing unit 27, and a storing and reading unit 29. Each of the functional units provides a function implemented by one or more of the hardware resources illustrated in FIG. 2. The one or more of the hardware resources operate in response to an instruction from the CPU 201 according to a program for the information processing apparatus 2 loaded from at least one of the ROM 202 or the HD 204 into the RAM 203. The information processing apparatus 2 further includes a storing unit 2000 that is implemented by at least one of the ROM 202 and the HD 204 illustrated in FIG. 2. The storing unit 2000 stores an information processing program to be executed by the information processing apparatus 2 and a device management application. The device management application is an application for setting registration setting information to perform a setting related to an introduction of a particular application and various settings for the registration device 4.

Group Information Management Table

FIG. 5A is a table illustrating an example of a group information management table for setup, according to the present embodiment. The storing unit 2000 stores a group information management database (DB) 2001, for example, in the form of the group information management table as illustrated in FIG. 5A. In the group information management table, items of a group name, an application identifier, a setting identifier, and a default group flag are stored in association with one another for each group identifier. The group identifier is information for identifying a group and is given as, for example, "G001," "G002," or the like. The group is created for the administrator to perform a setting related to introduction of a particular application to the registration device 4 and various settings in the registration device 4 using the information processing apparatus 2. The item "group" given the group name is for classifying the settings related to introduction of the particular application and the various settings introduced to the devices 4. That is, the group name indicates a particular name for collectively classifying the settings related to introduction of a particular application and various settings, and is given as, for example, "GROUP A," "GROUP B," "GROUP FOR MFP."

The application identifier is information for identifying the particular application to be introduced and is given as, for example, "AID001," "AID002," or the like. A user can register, in the group information management table, the application identifier for identifying an application desired to be made available on the registration device 4 and an application desired to be installed in the registration device 4.

The setting identifier is information for identifying a setting to be registered and is given as, for example, "SID001," "SID002," or the like. Note that the setting identifier is not necessarily given, and in this case, is indicated as "-." The user can register, in the group information management table, the setting identifier for identifying setting information to be used by the registration device 4 and setting information desired to be written on the registration device 4.

The default group flag is a state flag indicating whether or not the group is set as a default group. The value is "TRUE" in the state where the group is set as the default group and is "FALSE" in the state where the group is not set as the default group, for example.

Registered Application Information Management Table

FIG. 5B is a table illustrating an example of a registered application information management table according to the present embodiment. The storing unit 2000 stores a registered application information management DB 2002, for example, in the form of the registered application information management table as illustrated in FIG. 5B. In the registered application information management table, an application name and an applicable device type are stored in association with one another for each application identifier. The application name is an example of information for specifying an application. Instead of or in addition to the application name, the information for specifying the application may include an identifier for identifying the application, information indicating a memory area storing a program to be executed by the application for providing a function, or the address of the memory area. In a case where the application is a web application whose function is provided by an external server, the information for specifying the application may include information for accessing the external server such as a uniform resource locator (URL).

The application name indicates a name of an application to be registered and is given as, for example, "APPLICATION A," "APPLICATION B," "APPLICATION FOR MFP," or the like. The applicable device type is the type of a device in which a particular application and various settings can be registered, and is given as, for example, "MFP," "-," or the like. Note that the mark "-" is defined as meaning of "applicable regardless of type."

Registration Setting Information Management Table FIG. 5C is a table illustrating an example of a registration setting information management table according to the present embodiment. The storing unit 2000 stores a registration setting information management DB 2003, for example, in the form of the registration setting information management table as illustrated in FIG. 5C. In the registration setting information management table, a setting name, an applicable device type, and an input parameter are stored in association with one another for each setting identifier. The setting identifier is information for identifying various settings and is given as, for example, "SID001," "SID002," or the like. The setting name indicates a type or name of various settings to be registered in accordance with introduction of a particular application and is given as, for example, "PROXY SETTING," "FIRMWARE AUTOMATIC UPDATE TIME SETTING," "MFP DEDICATED SETTING A," or the like. The input parameter indicates various parameters used for the registration device 4 to introduce the particular application and the various settings and is given by information such as an "ADDRESS," a "PORT," an "UPDATE TIME," a "SETTING A," and a "SETTING B." Instead of the input parameter, information indicating a memory area or an address where a parameter is stored may be stored. A setting is setting information to be used by the registration device 4 and setting information to be written on the registration device 4. For example, the setting information may include setting information that is referred to by hardware that the registration device 4 uses and setting information that is referred to by an application or various types of software.

Device Information Management Table

FIG. 5D is a table illustrating an example of a device information management table according to the present embodiment. The storing unit 2000 stores a device information management DB 2004, for example, in the form of the device information management table as illustrated in FIG. 5D. In the device information management table, a serial number, a MAC address, and a device type are stored in association with one another for each device identifier.

The device identifier is information for identifying the registration device 4 and is given as, for example, "MID001," "MID002," or the like. The serial number indicates a serial number of the registration device 4 and is given as, for example, "DM-FTFTaaaa," "DM-FTFTbbbb," or the like. The MAC address indicates the MAC address of the registration device 4 and is given as, for example, "32:61:3C:4E:B6:05," "32:31:DE:AD:BE:EF," or the like. The device type indicates a type of the registration device 4 and is given as, for example, an "MFP" or the like.

Functional Unit of Information Processing Apparatus

A description is now given of the functional units of the information processing apparatus 2 in detail. The transmission and reception unit 21 of the information processing apparatus 2 illustrated in FIG. 4 is mainly implemented by processing performed by the CPU 201 with respect to the external device I/F 208 and the network I/F 209 illustrated in FIG. 2. The transmission and reception unit 21 transmits and receives various data (or information) to and from the communication management apparatus 3 via the communication network 100. Further, the transmission and reception unit 21 transmits and receives various data (or information) to and from the registration device 4 via the communication network 100 and the firewall 150. In the present embodiment, the transmission and reception unit 21 functions as an example of at least one of a transmission unit and a reception unit.

The operation receiving unit 22 is mainly implemented by the CPU 201 processing signals generated by various operations received by the keyboard 211 and the pointing device 212 illustrated in FIG. 2. The operation receiving unit 22 receives various operations from an administrator (or a user) who manages the information processing apparatus 2. In the present embodiment, the operation receiving unit 22 functions as an example of operation receiving unit.

The display control unit 24 is mainly implemented by processing performed by the CPU 201 with respect to the display 206 illustrated in FIG. 2. The display control unit 24 performs display control of various data (information) on the display 206. In the present embodiment, the display control unit 24 functions as an example of display control unit.

The determination unit 25 is mainly implemented by processing of the CPU 201 illustrated in FIG. 2 and performs various determinations in the information processing apparatus 2.

The application activating unit 26 is mainly implemented by processing performed by the CPU 201 with respect to the storing unit 2000 that is implemented by at least one of the ROM 202 or the HD 204 illustrated in FIG. 2. The application activating unit 26 activates the device management application stored in the storing unit 2000 and performs various settings for device registration and setup. In the present embodiment, the application activating unit 26 functions as an example of an activation unit.

The processing unit 27 is mainly implemented by processing of the CPU 201 illustrated in FIG. 2. Here, of the registration devices 4, a device to which a particular application can be introduced is referred to as a registrable device. The processing unit 27 performs processing of collating the type of the registrable device with the applicable device type in which an application or a setting the group information management DB 2001 can be registered. In the present embodiment, the processing unit 27 functions as an example of processing unit.

The storing and reading unit 29 is mainly implemented by processing of the CPU 201 illustrated in FIG. 2. The storing and reading unit 29 stores various data (or information) in the storing unit 2000 and reads various data (or information) from the storing unit 2000. In the present embodiment, the storing and reading unit 29 functions as an example of a storing and reading unit.

Functional Configuration of Communication Management Apparatus

As illustrated in FIG. 4, the communication management apparatus 3 includes a transmission and reception unit 31, an acquisition unit 32, a determination unit 35, a management unit 36, a generation unit 37, and a storing and reading unit 39. Each of the functional units is a function implemented by one or more of the hardware resources illustrated in FIG. 2. The one or more of the hardware resources operate in response to an instruction from the CPU 301 according to a program for the communication management apparatus 3 loaded from at least one of the ROM 302 and the HD 304 into the RAM 303. The communication management apparatus 3 further includes a storing unit 3000 that is implemented by at least one of the ROM 302 and the HD 304 illustrated in FIG. 2. The storing unit 3000 stores a communication management program to be executed by the communication management apparatus 3.

Registration Information Management Table

FIG. 5E is a table illustrating an example of a registration information management table according to the present embodiment. The storing unit 3000 stores a registration information management DB 3001, for example, in the form of the registration information management table as illustrated in FIG. 5E. In the registration information management table, a tenant identifier and a registration state are stored in association with one another for each device identifier.

The tenant identifier is information for identifying a tenant to which the registration device 4 belongs and is represented as, for example, "T00001," "T00002," or the like. The registration state indicates a state of registration of the registration device 4, such as whether registration of various information on the registration device 4 is completed ("TEMPORARILY REGISTERED"), or whether set-up processing of the registration device 4 is completed ("REGISTERED"). The tenant is information indicating a plurality of users who shares same software, that is, a company or the like which is a group of users. Each user or device in the tenant can use an application contracted by the tenant. An administrator of the tenant can give a user or device a permission to use multiple software instances (applications or a package of multiple applications) that are installed in a system. Note that a tenant is a management unit in which at least one of a user and a device is grouped. The tenant may be a set of users or devices, or a set of users and devices, belonging to a same organization or a set of users or devices, or a set of users and devices, existing in a certain area.

Device Information Management Table

The communication management apparatus 3 includes the device information management table. The storing unit 3000 stores a device information management DB 3002, for example, in the form of the device information management table. In the device information management table, a serial number, a MAC address, and a device type are stored in association with one another for each device identifier. Since the device information management table is the same as the table illustrated in FIG. 5D, description thereof is omitted.

The serial number indicates a serial number of the registration device 4 and is given as, for example, "DM-FTFTaaaa," "DM-FTFTbbbb," or the like. The MAC address indicates the MAC address of the registration device 4 and is given as, for example, "32:61:3C:4E:B6:05," "32:31:DE:AD:BE:EF," or the like. The device type indicates a type of the registration device 4 and is given as, for example, "MFP" or the like.

Functional Unit of Communication Management Apparatus

A description is now given of the functional units of the communication management apparatus 3 in detail. The transmission and reception unit 31 of the communication management apparatus 3 illustrated in FIG. 4 is mainly implemented by processing performed by the CPU 301 with respect to the external device I/F 308 and the network I/F 309 illustrated in FIG. 2. The transmission and reception unit 31 transmits and receives various data (or information) to and from the information processing apparatus 2 and the registration device 4 via the communication network 100. In the present embodiment, the transmission and reception unit 31 functions as an example of at least one of a transmission unit and a reception unit.

The acquisition unit 32 is mainly implemented by processing of the CPU 301 illustrated in FIG. 2. The acquisition unit 32 acquires information including identification information and the tenant identifier of the registration device 4 in response to an instruction from an external device such as a personal computer (PC) owned by a registrant working in a factory or the like having the registration device 4. Alternatively, the acquisition unit 32 acquires information in response to an operation performed by the registrant to an operation receiving unit of the communication management apparatus 3. In the present embodiment, the acquisition unit 32 functions as an example of an acquisition unit. Note that the registrant may include a customer engineer who introduces the registration device 4.

The determination unit 35 is mainly implemented by processing of the CPU 301 illustrated in FIG. 2 and performs various determinations in the communication management apparatus 3. In the present embodiment, the determination unit 35 functions as an example of determination unit.

The management unit 36 is mainly implemented by processing of the CPU 301 illustrated in FIG. 2 and has the following management functions in the communication management apparatus 3. In the present embodiment, the management unit 36 functions as an example of a management unit.

Device Information Management Function

The management unit 36 manages information transmitted by the registration device 4. The management unit 36 stores a state of the information processing apparatus 2 based on the information transmitted from the registration device 4 and stores management information such as a state of the registration device 4 and address information.

Registration Information Management Function

The management unit 36 stores information for determining a relationship between the registration device 4 and the tenant (indicating which device belongs to which tenant). In addition, the management unit 36 stores association information between the registration device 4 and the application (for example, which application is usable by the registration device 4) at the time of registration of the registration device 4 and the application.

Identification Information Management Function

The management unit 36 registers the device identifier of the registration device 4 in the communication management apparatus 3 at the time of kitting of the registration device 4 and then stores the device identifier acquired from the registration device 4 when the registration device 4 is installed. The management unit 36 stores a result of a propriety of registration of the registration device 4, determined by the device management application based on the stored device identifier and the device identifier of the registration device 4. Further, management unit 36 stores the identification information (a serial number, a MAC address, and the like) to be used when the registration device 4 is registered in the communication system 1.

Group Information Management Function

The management unit 36 stores group information that includes various settings such as a setting of a particular application, a proxy setting, and the like at the time of setting up the registration device 4.

The generation unit 37 is mainly implemented by processing of the CPU 301 illustrated in FIG. 2 and generates an alert message indicating that a device is not registrable in the communication system 1, a list of an unregistrable application, and a list of an unregistrable setting. In the present embodiment, the generation unit 37 functions as an example of a generation unit.

The storing and reading unit 39 is mainly implemented by processing of the CPU 201 illustrated in FIG. 2. The storing and reading unit 29 stores various data (or information) in the storing unit 3000 and reads various data (or information) from the storing unit 3000. In the present embodiment, the storing and reading unit 39 functions as an example of a storing and reading unit.

Functional Configuration of Registration Device

As illustrated in FIG. 4, the registration device 4 includes a transmission and reception unit 41, an operation receiving unit 42, a display control unit 44, a registration unit 46, and a storing and reading unit 49. Each of the functional units is a function implemented by one or more of the hardware resources illustrated in FIG. 3. The one or more of the hardware resources operate in response to an instruction from the CPU 401 according to a program for the registration device 4 loaded from at least one of the ROM 402a or the HD 408 into the RAM 402b. The registration device 4 further includes a storing unit 4000 that is implemented by at least one of the ROM 402a or the HD 408 illustrated in FIG. 3. The storing unit 4000 stores a registration object program to be executed by the registration device 4.

Functional Unit of Registration Device

A description is now given of the functional units of the registration device 4 in detail. The transmission and reception unit 41 of the registration device 4 illustrated in FIG. 4 is mainly implemented by processing performed by the CPU 401 with respect to the short-range communication circuit 420 and the network I/F 450 illustrated in FIG. 3. The transmission and reception unit 41 transmits and receives various data (or information) to and from the communication management apparatus 3 and the information processing apparatus 2 via the communication network 100. In the present embodiment, the transmission and reception unit 41 functions as an example of at least one of a transmission unit or a reception unit.

The operation receiving unit 42 is mainly implemented by the CPU 401 processing signals generated by various operations received by the control panel 440 illustrated in FIG. 3. The operation receiving unit 42 receives operations to various buttons from a user. In the present embodiment, the operation receiving unit 42 functions as an example of an operation receiving unit.

The display control unit 44 is mainly implemented by processing performed by the CPU 401 with respect to the control panel 440 illustrated in FIG. 3. The display control unit 44 performs display control of various types of processing performed in the registration device 4. In the present embodiment, the display control unit 44 functions as an example of display control unit.

The registration unit 46 is mainly implemented by processing of the CPU 401 illustrated in FIG. 3 and performs device registration, setup processing of a particular application and various settings, and the like in the registration device 4. In the present embodiment, the registration unit 46 functions as an example of a registration unit.

The storing and reading unit 49 is mainly implemented by processing performed by the CPU 401 with respect to at least one of the ROM 402a or the HD 408 illustrated in FIG. 3. The storing and reading unit 49 stores various data (or information) in the storing unit 4000 or reads various data (or information) from the storing unit 4000. In the present embodiment, the storing and reading unit 49 functions as an example of a storing and reading unit.

Processing and Operation of Embodiment

Referring now to FIGS. 6 to 18, a description is given of processing and operations performed by the communication system according to the first embodiment. In the first embodiment, a description is given of a setup sequence for the registration device 4 to perform a setting of a particular application and various settings. FIG. 6 is a sequence chart illustrating an example of a part of setup processing according to the present embodiment.

Processing of Setup Group Creation

As illustrated in FIG. 6, the information processing apparatus 2 creates a group for setup (S11) in response to a request from the administrator. The group for setup is created in order to classify the registration device 4, which is a registration object, depending on a type of application and setting that the administrator desires to introduce to the registration device 4. In creating a group, the administrator can perform grouping according to the following classification rule, for example. Note that the administrator may be an administrator of any of a plurality of tenants managed by the information processing apparatus 2. In this case, the administrator can perform grouping within a range of users or devices belonging to a tenant managed by the administrator. The tenant identifier for identifying a tenant may be stored in association with the group created at this time. In a case where a group is created by device type, the group is created for each device type, for example, such as an "MFP," an "IWB," a video conference system, and a projector ("PJS"). In a case where a group is created by department, the group is created for each department, for example, such as a "DESIGN," a "PLANNING," and a "GENERAL AFFAIRS." In a case where a group is created by business site, the group is created for each business site indicated as, for example, "OMORI," "EBINA," and "SHIN-YOKOHAMA."

In creating the group for setup in S11, the operation receiving unit 22 and the storing and reading unit 29 of the information processing apparatus 2 assign the group identifier ("G001," "G002," etc.) to the group name ("GROUP A," "GROUP B," etc.) set by an input to a group name input section 2211, which will be described later, and store the group name and the group identifier in association with each other in the group information management DB 2001 (see FIG. 5A). In addition, the operation receiving unit 22 and the storing and reading unit 29 assign the application identifier ("A001," "A002," etc.) to the application name ("APPLICATION A," "APPLICATION B," etc.) set by an input to an application input section 2212 and by an operation to an addition button 2213, which will be described later, and store the application name and the application identifier in association with each other in the registered application information management DB 2002 (see FIG. 5B). Furthermore, the operation receiving unit 22 and the storing and reading unit 29 assign the setting identifier ("S001," "S002," etc.) to the setting name ("PROXY SETTING," "FIRMWARE AUTOMATIC UPDATE TIME SETTING," etc.) set by an input to an introduction setting input section 2216 and by an operation to an addition button 2217, which will be described later, and store the setting name and the setting identifier in association with each other in the registration setting information management DB 2003 (see FIG. 5C).

Details of a user interface (UI) in creating a group will be described with reference to examples of a display screen illustrated in FIGS. 8 to 10 described later.

Transmission and Reception Processing of Various Types of Information of Registration Device On the other hand, a registrant who registers one or more devices (such MFPs) as the registration devices 4 registers various types of information (a device identifier, a tenant identifier, a serial number, a MAC address, and the like) of each of the devices in the communication management apparatus 3 in advance at the time of shipping or the like of the devices. In other words, the registrant accesses the communication management apparatus 3 from a factory or the like from which the devices are shipped and performs registration processing of various types of information including the device identifier, the tenant identifier, the serial number, and the MAC address of each of the shipped devices to be registered. Accordingly, the acquisition unit 32 of the communication management apparatus 3 acquires various types of information of each of the devices given by the registrant. Thereafter, in cooperation with the storing and reading unit 39, the management unit 36 registers various types of information including the device identifier, the tenant identifier, the serial number, and the MAC address of each of the shipped devices 4 acquired by the acquisition unit 32 in the corresponding items of the registration information management DB 3001 (see FIG. 5E) and the device information management DB 3002 (illustrated in FIG. 4 which is similar to the device information management DB 2004 in FIG. 5D) (S12). Further, in S12, the management unit 36 updates the registration state corresponding to the device identifier in the registration information management DB 3001 (see FIG. 5E) to be "TEMPORARILY REGISTERED." The registration state updated in S12 is a state in which the shipped device is registered temporarily (hereinafter "temporary registration device 4).

The temporary registration device prepares for communication with the communication management apparatus 3 (S13). The preparation for communication is, for example, establishing a communication protocol between the registration device 4 and the communication management apparatus 3. In order to communicate with the communication management apparatus 3 via the communication network 100, the temporary registration device 4 activates a particular communication protocol executed by the registration object program to be executed by the temporary registration device 4. Note that, in the present embodiment, it is assumed that the particular communication protocol is established in advance for communication between the registration device 4 and the communication management apparatus 3.

After the preparation for communication is completed, the transmission and reception unit 41 of the temporary registration devices 4 transmits device information thereof to the communication management apparatus 3 (S14). Accordingly, the transmission and reception unit 31 of the communication management apparatus 3 receives the device information transmitted by the temporary registration devices 4. The device information includes the device identifier, the serial number, and the MAC address of the temporary registration device 4. In S14, a tenant identifier may be input by a user or the registrant. In this case, the transmission and reception unit 41 may transmit the tenant identifier to the communication management apparatus 3 in addition to the device information. Note that the above-described processing of S11 to S14 are performed asynchronously among the information processing apparatus 2, the communication management apparatus 3, and the temporary registration device 4.

After receiving the device information transmitted by the temporary registration device 4, the communication management apparatus 3 determines the propriety of registration thereof in the communication system 1 (S15). Details of the processing of S15 and details of information of the device registerable in the communication system 1 will be described with reference to a flowchart described later.

Details of Processing for Determining Propriety of Registration of Device

Figure 7:
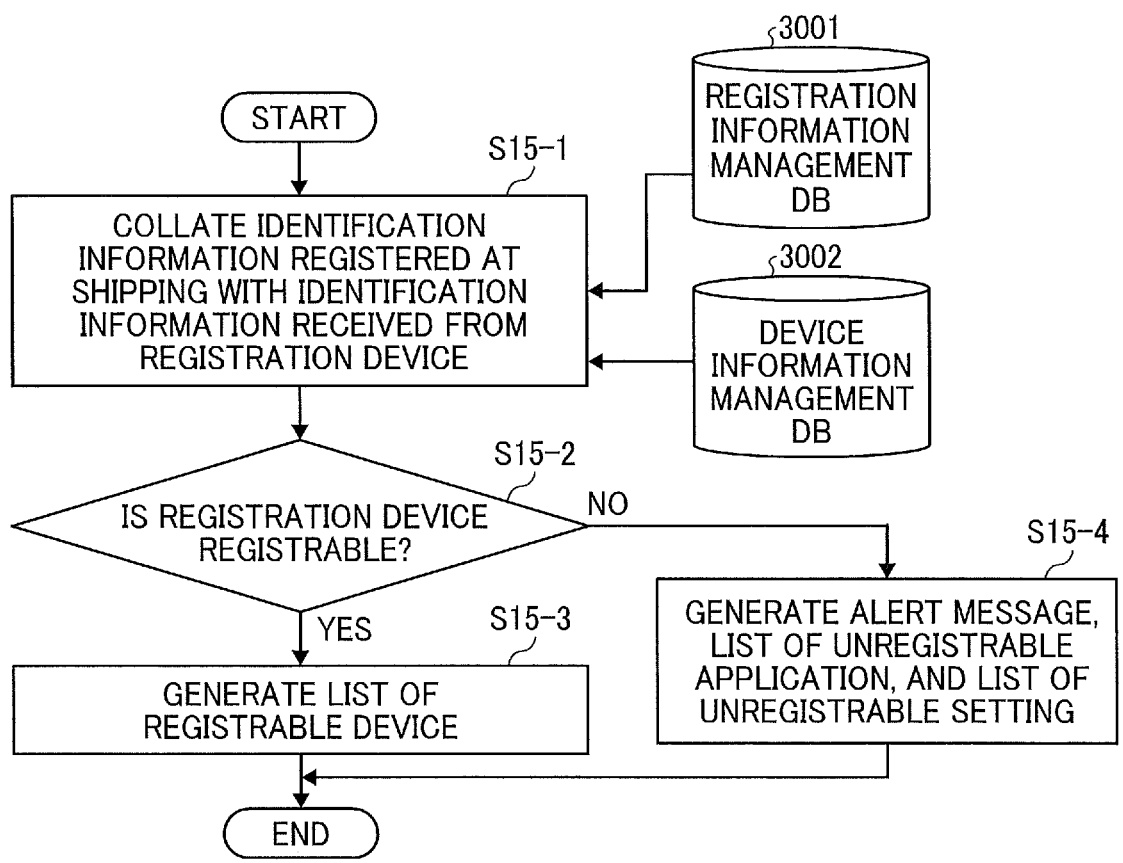
FIG. 7 is a flowchart illustrating an example of processing to determine a propriety of registration of a device according to one embodiment.

FIG. 7 is a flowchart illustrating an example of processing to determine a propriety of registration of a device in the communication system according to the present embodiment. As illustrated in FIG. 7, the acquisition unit 32 collates the identification information registered at the time of shipping with the identification information received from one or more temporary registration devices 4 (S15-1). The identification information includes a part or all of information such as the device identifier, the serial number, the MAC address, the device type, and the like. Specifically, the acquisition unit 32 acquires the identification information corresponding to the device identifier, the serial number, and the MAC address of each of the one or more temporary registration devices 4 received by the transmission and reception unit 31 from the storing unit 3000. Thereafter, the management unit 36 collates the device identifier, the registration state, the serial number, and the MAC address of each of the temporary registration devices registered in the registration information management DB 3001 (see FIG. 5E) and the device information management DB 3002 (illustrated in FIG. 4 which is similar to the device information management DB 2004 in FIG. 5D) with the device identifier, the serial number, and the MAC address received from the registration device 4 respectively.

After the collation performed by the management unit 36, the determination unit 35 determines the propriety of registration of each of the temporary registration devices 4 based on a collating result (S15-2). That is, the determination unit 35 determines the propriety of registration of the temporary registration device 4 in the communication system 1 based on the device information that includes the identification information transmitted by the temporary registration device 4. The propriety of registration is determined by checking whether or not, for example, the identification information in the DB matches the identification information received from the temporary registration device 4. For example, it is determined that registration is feasible by the partial or full match of the identification information and is not feasible by partial or full mismatch of the identification information.

In a case where it is determined that the temporary registration device 4 is registerable in the communication system 1 (YES in S15-2), the generation unit 37 generates a list of the registerable devices and exits this flow (S15-3). On the other hand, in a case where it is determined that the temporary registration device 4 is not registerable in the communication system 1 (NO in S15-2), the generation unit 37 generates an alert message, a list of an unregistrable application, and a list of an unregistrable setting, and exits this flow (S15-4). Note that the alert message, the list of the unregistrable application, and the list of the unregistrable setting generated by the generation unit 37 may be transmitted to the registration device 4 or the information processing apparatus 2.

In a case where the tenant identifier is included in the identification information received by the communication management apparatus 3 from the registration device 4, the communication management apparatus 3 may generate the registration information management table based on the identification information and the tenant identifier received from the registration device 4. In this case, the communication management apparatus 3 allows the registrant to omit an input of the tenant identifier.

Returning to FIG. 6, after the determination of the propriety of registration of the device, the transmission and reception unit 31 of the communication management apparatus 3 transmits a determination result of the propriety of registration (registerable device information) to the information processing apparatus 2 (S16). Accordingly, the transmission and reception unit 21 of the information processing apparatus 2 receives the determination result of the propriety of registration transmitted by the communication management apparatus 3. More specifically, the transmission and reception unit 21 of the information processing apparatus 2 receives the registerable device information of, among the registration devices 4, each registerable object device in which a particular application can be registered, transmitted by the communication management apparatus 3. The determination result of the propriety of registration (registerable device information) received at this time includes the device identifier, the serial number, the MAC address, and the device type information indicating a type of device of the registerable device determined to be registerable in S15.

After receiving the determination result of the propriety of registration, the storing and reading unit 29 registers the device identifier, the serial number, the MAC address, and the device type indicating the type of the registrable device included in the received determination result of the propriety of registration in the device information management DB 2004 (see FIG. 5D) (S17).

Setup Group Creation Screen

Details of the UI in creating a group are described with reference to examples of a display screen illustrated in FIGS. 8 to 10.

Example of Display Screen

Figure 8:
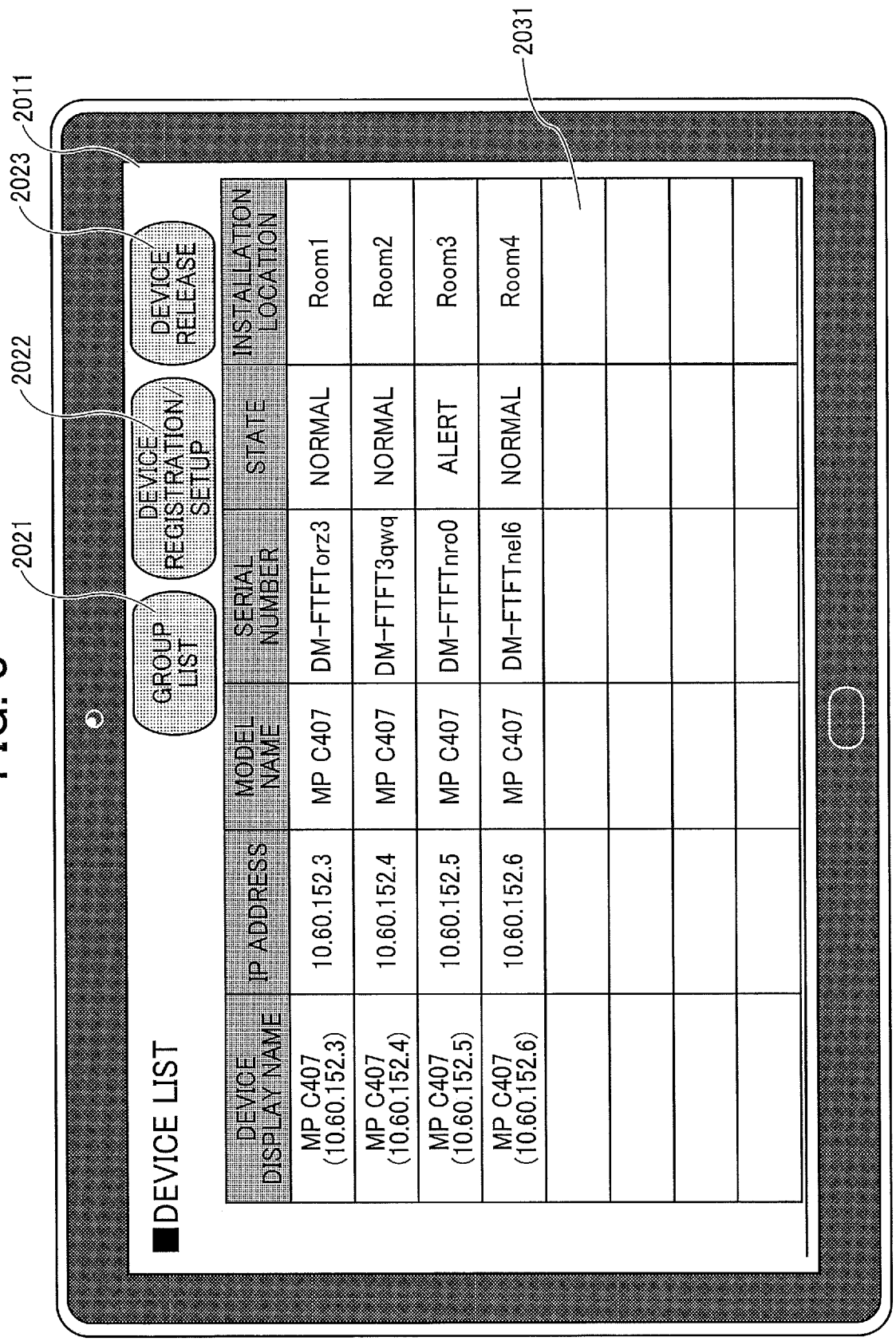
FIG. 8 is a diagram illustrating an example of a screen displaying a device list according to one embodiment.

FIG. 8 is a diagram illustrating an example of a screen displaying a device list according to the present embodiment. As illustrated in FIG. 8, the display control unit 24 of the information processing apparatus 2 displays a device list screen 2011 on the display 206 in S11 described above. On the device list screen 2011, a group list button 2021 for transitioning to a group list screen, a device registration/setup button 2022 for performing at least one of device registration or setup, and a device release button 2023 for releasing a registered device are displayed together. An administrator who performs a setting using the information processing apparatus 2 can transition to another screen and perform each operation by operating the above-described buttons.

Further, on the device list screen 2011, a device list display section 2031 is displayed by the display control unit 24. The device list screen 2011 displays a list of, among the registration devices 4, the registerable devices notified by the communication management apparatus 3. The device list screen 2011 may display a list of, for example, the registration device 4 belonging to a tenant to which a user of the information processing apparatus 2 belongs. In the device list display section 2031, items of a device display name, an internet protocol (IP) address, a model name, a serial number, a state, and an installation location are displayed in the form of, for example, a table. The device display name is displayed as a name such as "MP C407 (10.60.152.3)." The IP address may be given as, for example, "10.60.152.3" or the like and may be displayed in a column of the device display name. The model name is displayed in the same content as the device display name, for example, in "MP C407" or the like. The serial number is indicated as, for example, "DM-FTFToez3" or the like. The state indicates a registration state of the device and is displayed as, for example, "NORMAL," "ALERT," or the like. The installation location indicates a location in which the registration device 4 is installed and is displayed in, for example, "Room1" or the like.

Example of Display Screen

Figure 9:
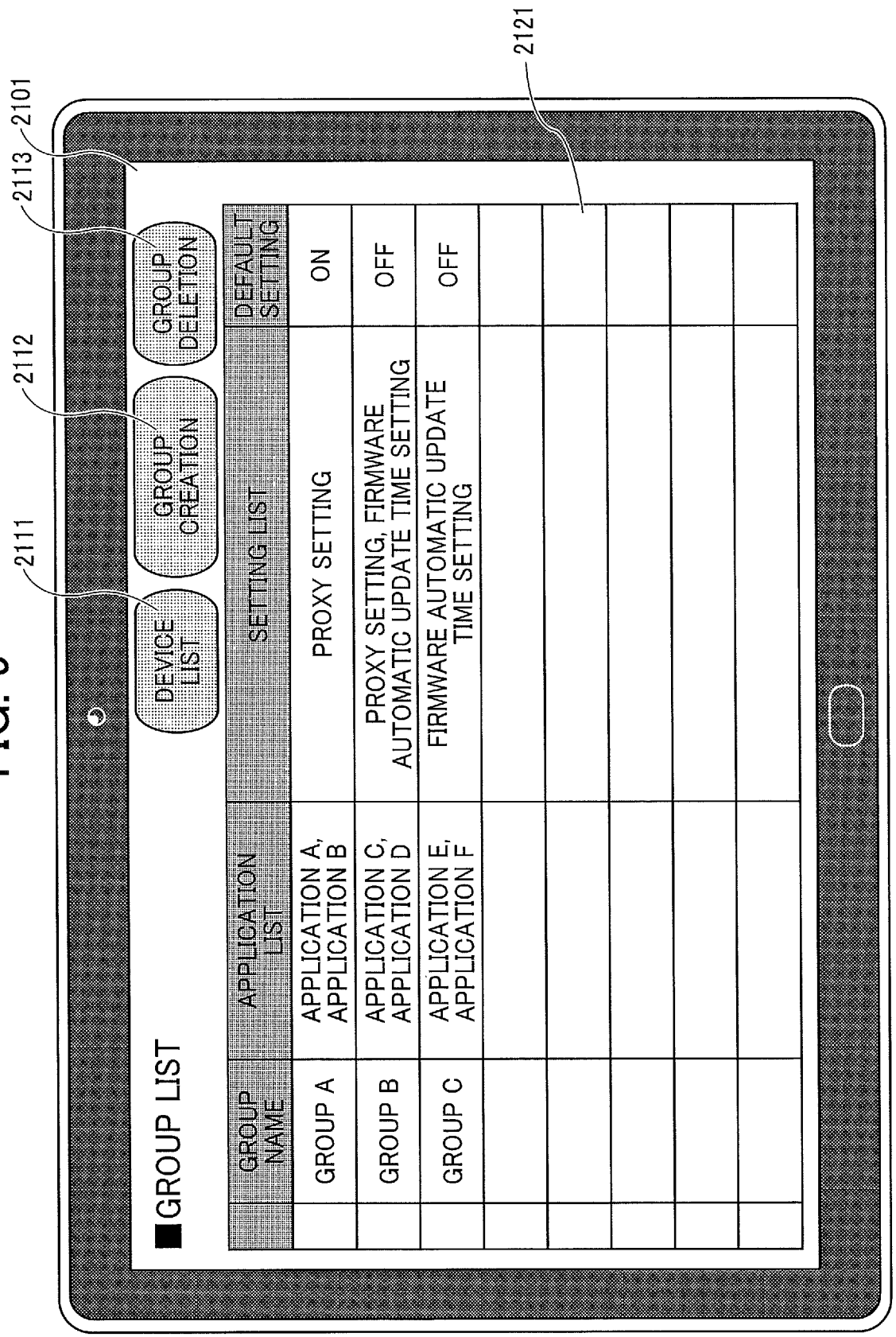
FIG. 9 is a diagram illustrating an example of a screen displaying a group list according to one embodiment.

FIG. 9 is a diagram illustrating an example of a screen displaying a group list according to the present embodiment. As illustrated in FIG. 9, in a case where the operation receiving unit 22 receives an operation to the group list button 2021 illustrated in FIG. 8, the display control unit 24 of the information processing apparatus 2 displays a group list screen 2101 on the display 206. On the group list screen 2101, a device list button 2111 for transitioning to the device list screen, a group creation button 2112 for creating a group, and a group deletion button 2113 for deleting a created group are displayed. The administrator can transition to another screen and perform each operation by operating the above-described buttons. In other words, the group list button 2021 and the device list button 2111 function as toggle buttons for transitioning to the screens of each other.

Further, a group list display section 2121 is displayed on the group list screen 2101 by the display control unit 24. In the group list display section 2121, items of a group name, an application list, a setting list, and a default setting are displayed in the form of, for example, a table. The group name is a name for classifying applications and settings that the administrator desires to register and is given as, for example, "GROUP A" or the like. A group displayed on the group list screen 2101 is a group of users of the information processing apparatus 2. The application list is displayed by the name of application such as "APPLICATION A," "APPLICATION B," or the like. The setting list displayed includes contents such as "PROXY SETTING," "FIRMWARE AUTOMATIC UPDATE TIME SETTING," or the like. The application list is a list of an application and setting information input and registered in association with a group of the users of the information processing apparatus 2. The default setting is displayed as, for example, "ON" or "OFF" indicating a state whether or not the default setting is set. FIG. 9 is an example of a list screen of a particular application and various settings belonging to a particular group.

Example of Display Screen

Figure 10:
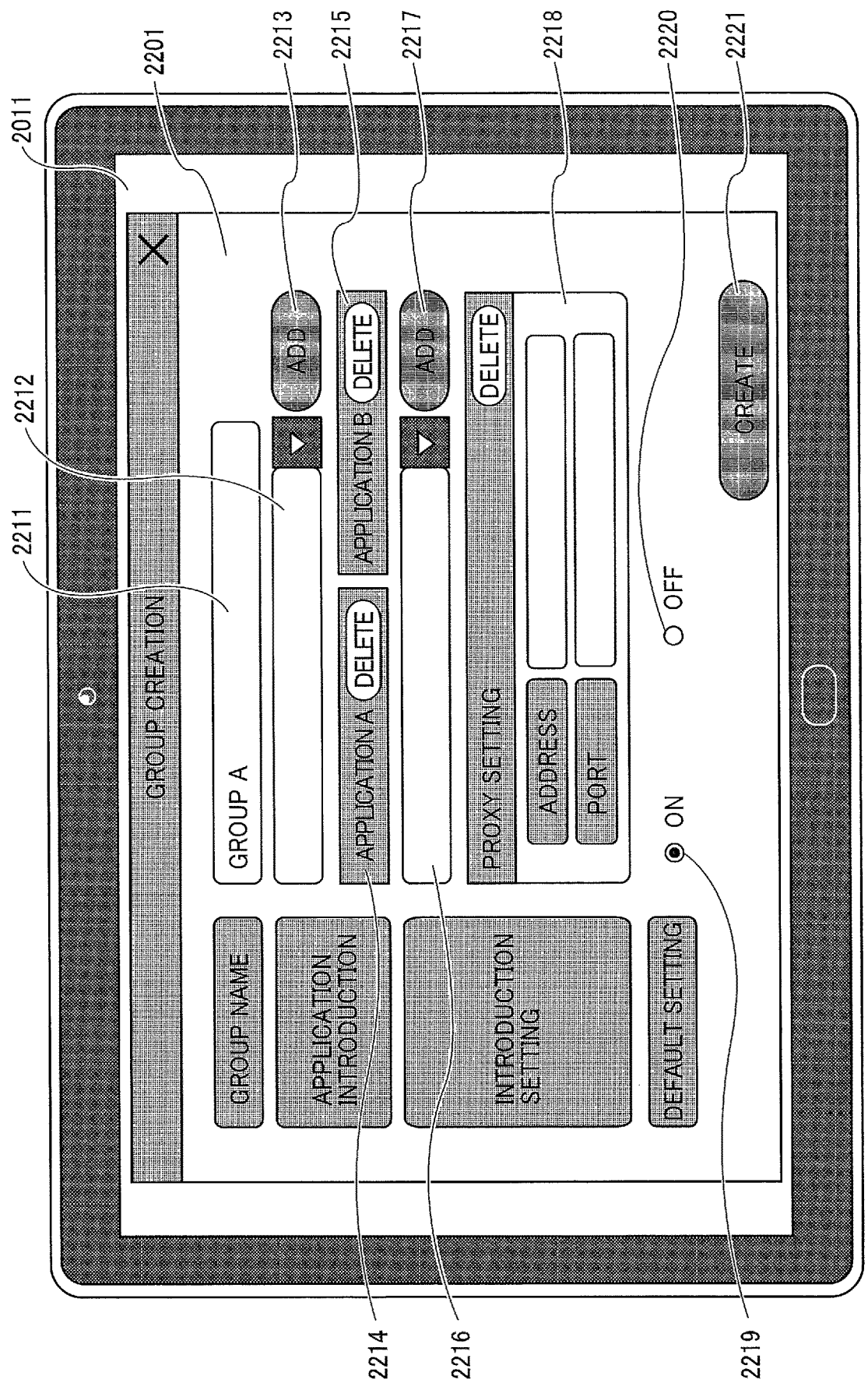
FIG. 10 is a diagram illustrating an example of a display screen in creating a group according to one embodiment.

FIG. 10 is a diagram illustrating an example of a display screen in creating a group according to the present embodiment. As illustrated in FIG. 10, in a case where the operation receiving unit 22 receives an operation to the group creation button 2112 illustrated in FIG. 9, the display control unit 24 of the information processing apparatus 2 displays a group creation screen 2201 (dialog screen) laid over the group list screen 2101 displayed on the display 206. Further, the display control unit 24 displays the following input sections and buttons on the group creation screen 2201. The group creation screen 2201 is an example of a group creation screen. A group name input section 2211 is a section for inputting a group name. By inputting a group name in the group name input section 2211, the group identifier ("G001," "G002," etc.) stored in the group information management DB 2001 (see FIG. 5A) and the input group name ("GROUP A," "GROUP B," etc.) are associated with each other. An addition button may be separately arranged near the group name input section 2211. The application input section 2212 including a pull-down key is a section for inputting a name of an application to be introduced (registered). The addition button 2213 is a button for adding the application whose name has been introduced (registered) already. By inputting an application name in the application input section 2212 and operating the addition button 2213, the group identifier stored in the group information management DB 2001, the application identifier (A001, A002, etc.) stored in the registered application information management DB 2002 (see FIG. 5B), and the input application name ("APPLICATION A," "APPLICATION B," etc.) are associated with one another. Application deletion sections 2214 and 2215 each including a deletion button are sections for deleting the application that has been added as an application to be introduced. The introduction setting input section 2216 including a pull-down key is a section for inputting an introduction (registration) setting. The addition button 2217 is a button for adding the introduction (registration) setting that has been set already. By inputting the setting name to the introduction setting input section 2216 and operating the addition button 2217, the group identifier stored in the group information management DB 2001, the setting identifier (S001, S002, etc.) stored in the registration setting information management DB 2003 (see FIG. 5C), and the input setting name ("PROXY SETTING," "FIRMWARE AUTOMATIC UPDATE TIME SETTING," etc.) are associated with one another. A proxy setting input section 2218 includes a button for deleting a proxy setting that is an example of an introduction setting and sections for inputting address information and port information relating to the proxy setting. A radio button "ON" 2219 is a button for selecting the default setting and a radio button "OFF" 2220 is a button for deselecting the default setting. In a case where the radio button "ON" 2219 for selecting the default setting is operated, a default group flag to be described later is set to "TRUE." A creation button 2221 is a button for validating all the settings after setting each setting.

Note that the group creation screen 2201 illustrated in FIG. 10 and the input sections and the operation buttons arranged in the group creation screen 2201 are examples, and the display content may be changed as appropriate in accordance with the setting content, the specification of the registration device 4, and the like. The created group is registered in the group information management DB 2001 and is added and displayed on the group list screen 2101 illustrated in FIG. 9.

Setup Processing

Figure 11:
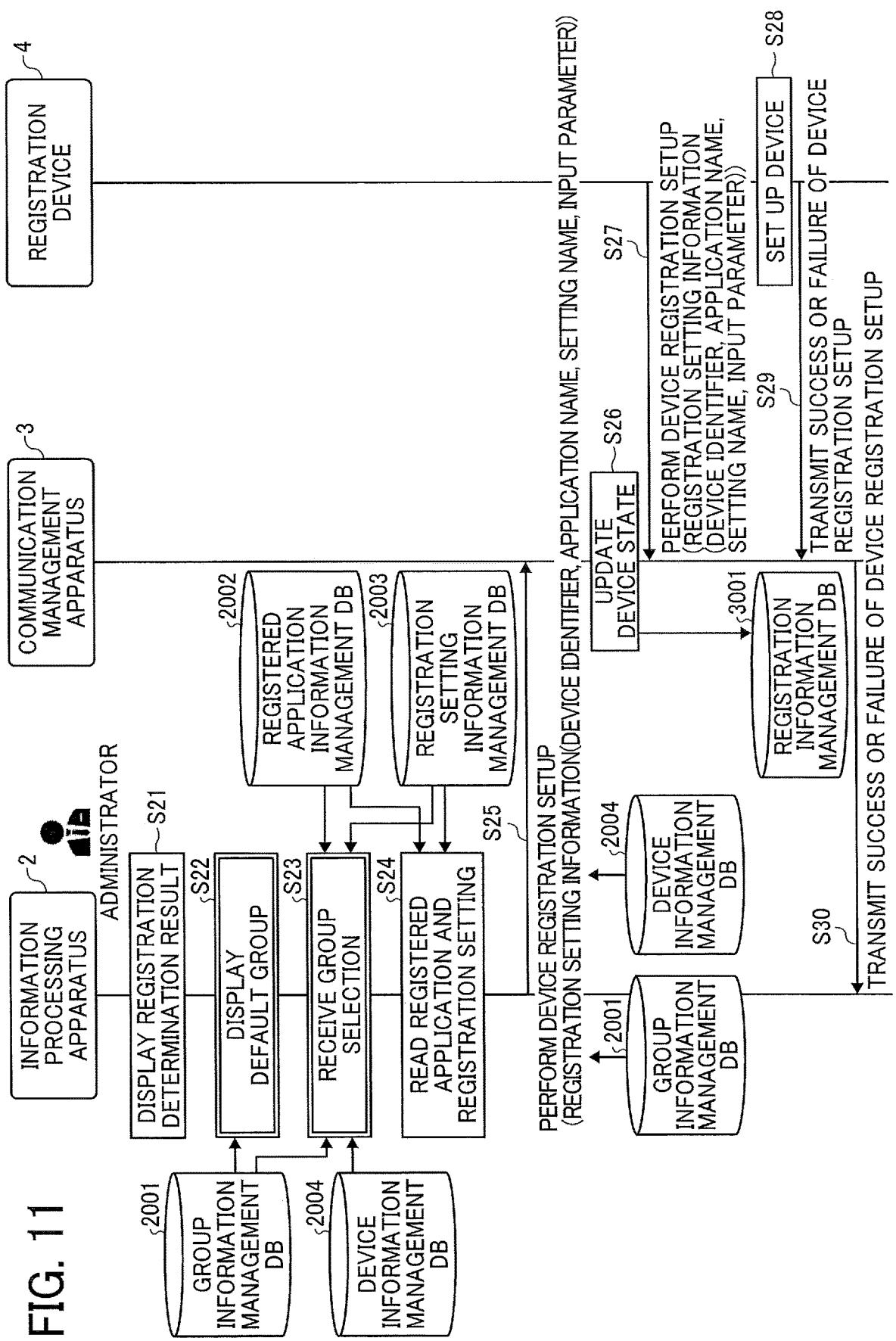
FIG. 11 is a sequence chart illustrating an example of the setup processing according to one embodiment.

A description is now given of a setup sequence of the registration device 4. FIG. 11 is a sequence chart illustrating an example of setup processing according to the present embodiment.

After receiving the determination result of the propriety of registration transmitted by the communication management apparatus 3 in the processing of S16 described above, the display control unit 24 of the information processing apparatus 2 displays the device list screen 2011 illustrated in FIG. 8, which indicates the determination result of the propriety of registration, on the display 206 (S21). At this time, in order to perform any one of device registration and setup, the administrator operates the device registration/setup button 2022 to transition to a device registration/setup screen illustrated in FIG. 15 and subsequent figures.

Returning to FIG. 11, the display control unit 24 displays a screen for display processing of a default group on the display 206 (S22).

Default Group Display Processing

Figure 12:
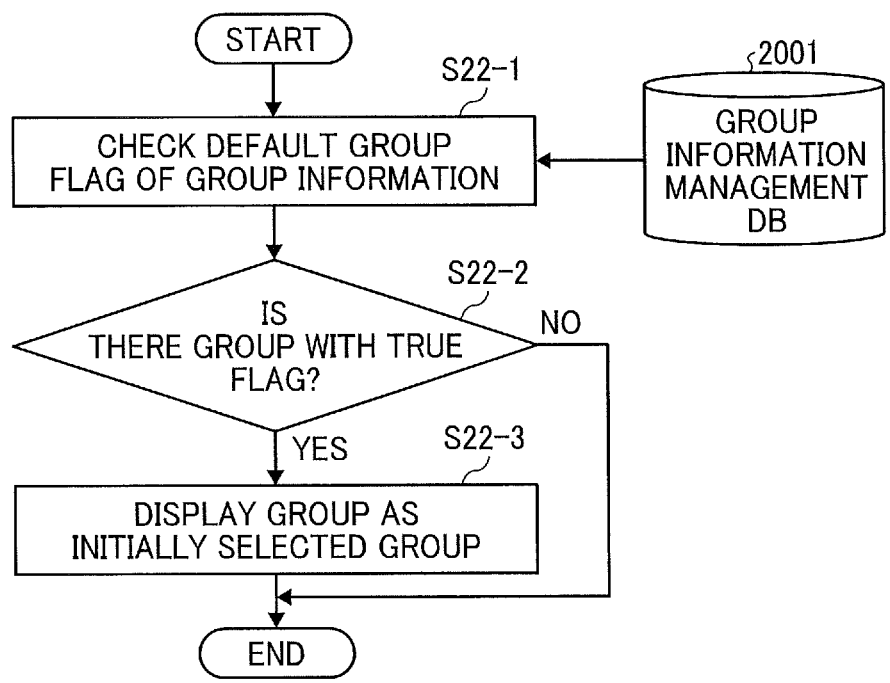
FIG. 12 is a flowchart illustrating an example of default group display processing according to one embodiment.

FIG. 12 is a flowchart illustrating an example of a default group display processing according to the present embodiment. As illustrated in FIG. 12, the processing unit 27 checks the default group flag of the group information (S22-1). Specifically, in cooperation with the storing and reading unit 29, the processing unit 27 searches the group information management DB 2001 (see FIG. 5A) using the input group name or the group identifier corresponding to the input group name as a search key to read the default group flag corresponding to the input group name or the group identifier corresponding to the input group name.

Subsequently, the determination unit 25 determines whether or not there is a group in which the read default group flag indicates the "TRUE" (S22-2). In a case where there is a group whose read default group flag indicates the "TRUE" (YES in S22-2), the display control unit 24 displays the content of the group information on the display 206 as a group whose group name is initially selected and exits this flow (S22-3). On the other hand, in a case where there is no group whose read default group flag indicates the "TRUE" (NO in S22-2), the information processing apparatus 2 exits this flow without performing any particular processing.

Group Selection Reception Processing

Returning to FIG. 11, the operation receiving unit 22 receives, for example, an operation of group selection by the administrator (S23).

Figure 13:
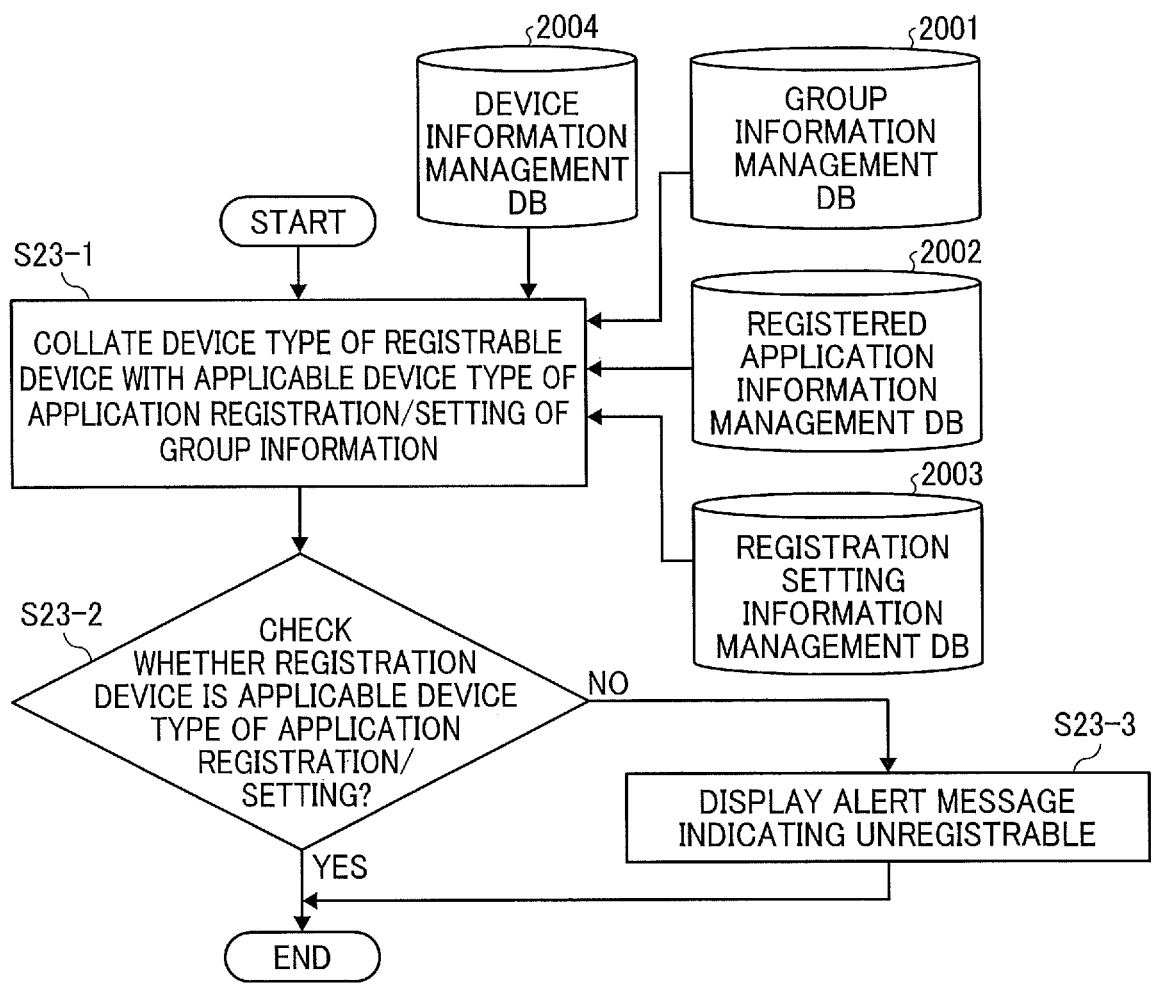
FIG. 13 is a flowchart illustrating an example of group selection reception processing according to one embodiment.

FIG. 13 is a flowchart illustrating an example of group selection reception processing according to the present embodiment. As illustrated in FIG. 13, the processing unit 27 collates the device type of the registrable device with the applicable device type in which an application and a setting of the group information can be registered (S23-1). Specifically, in cooperation with the storing and reading unit 29, the processing unit 27 searches the device information management DB 2004 (see FIG. 5D) using the device identifier (e.g., "MID001") of the registrable device transmitted by the communication management apparatus 3 as a search key to read the device type corresponding to the device identifier of the registrable device. Note that the device identifier is not limited to one, and there may be a number corresponding to the registration devices 4.

Subsequently, in cooperation with the storing and reading unit 29, the processing unit 27 searches the group information management DB 2001 (see FIG. 5A) using a group name of a group selected to be associated with a registrable device on a device registration/setup screen 2311, which will be described later, and a group identifier corresponding to the group name as search keys, to read one or more application identifiers and one or more setting identifiers corresponding to the group name and the group identifier. Further, in cooperation with the storing and reading unit 29, the processing unit 27 searches the registered application information management DB 2002 (see FIG. 5B) using the read application identifier as the search key to read an application name and an applicable device type corresponding to the read application identifier. Furthermore, in cooperation with the storing and reading unit 29, the processing unit 27 searches the registration setting information management DB 2003 (see FIG. 5C) using the read setting identifier as search key, to read a setting name, an applicable device type, and an input parameter corresponding to the read setting identifier. The processing unit 27 collates the various types of information read in the above-described series of processing.

Subsequently, the determination unit 25 determines whether or not the registration device 4 matches the applicable device type in which a particular application or setting can be registered based on the various types of information read by the processing unit 27 (S23-2). That is, the determination unit 25 determines whether or not a particular application and various settings can be registered in the registration device 4 based on the device identifier, the application identifier for identifying the particular application, and the setting identifier for identifying the settings. Specifically, the determination unit 25 determines whether or not the device type corresponding to the device identifier (e.g., "MID001") of the registration device 4 matches the applicable device type stored in the registered application information management DB 2002 (see FIG. 5B) and the registration setting information management DB 2003 (see FIG. 5C). In this case, since the device type assigned with the device identifier "MID001" is "MFP" and the applicable device type stored in the registered application information management DB 2002 (see FIG. 5B) and the registration setting information management DB 2003 (see FIG. 5C) indicate "-" (applicable regardless of type), it is determined that the "MFT" is an applicable device type.

As a result of the determination in such a method, in a case where it is determined that the registration device 4 matches the applicable device in which the application and settings can be registered (YES in S23-2), the determination unit 25 exits this flow. On the other hand, in a case where it is determined that the registration device 4 is not an applicable device type in which the application and the setting can be registered (NO in S23-2), the display control unit 24 displays an alert message indicating unregistrable on the display 206 and exits this flow (S23-3). Thus, the information processing apparatus 2 can determine, for the group selected to be associated with the registrable device on the device registration/setup screen 2311, whether or not the applicable device type in which an application or setting associated with the group can be registered matches the device type of the registrable device. Although, in the above-description, the processing is performed after a registrable device is selected on the device registration/setup screen 2311, the present disclosure is not limited thereto. For example, the information processing apparatus 2 may perform the above-described determination at a timing at which a group is displayed in a selectable manner on the device registration/setup screen 2311. At this time, the information processing apparatus 2 can determine, for all the groups stored in the group information management DB 2001 (see FIG. 5A), whether or not an applicable device type in which an application and a setting associated with each group can be registered matches the device type of the registrable device. Among all the groups stored in the group information management DB 2001 (see FIG. 5A), the information processing apparatus 2 displays, in a selectable manner, only a group, for which it is determined in S23-2 that the registration device 4 matches an applicable device type in which an application and a setting can be registered, and receives selection of one group from a user. In a case where a plurality of applications or a plurality of settings are associated with a group, it is determined that the registration device 4 matches an applicable device type in a case where all the plurality of applications and all the plurality of the settings can be registered in the applicable device type.

Example of Display Screen

Figure 14:
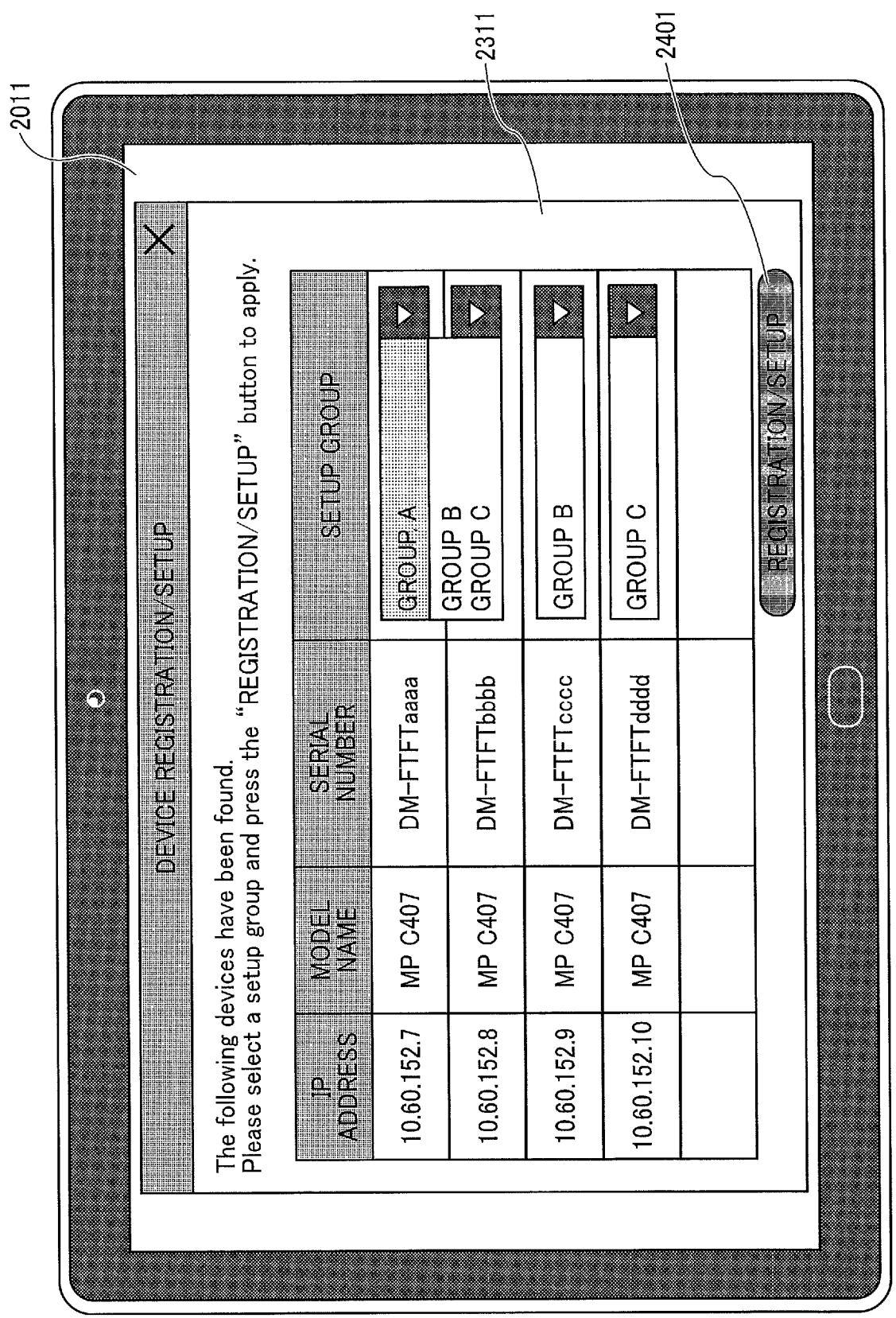
FIG. 14 is a diagram illustrating an example of a display screen in selecting a setup group according to one embodiment.

An example of a display screen in the above-described group selection reception processing is described below. FIG. 14 is a diagram illustrating an example of a display screen in selecting a setup group according to the present embodiment. In the state illustrated in FIG. 8, in a case where an operation to the device registration/setup button 2022 is received by the operation receiving unit 22, the display control unit 24 displays a dialog screen such as the device registration/setup screen 2311 laid over the device list screen 2011 displayed on the display 206. In addition, the display control unit 24 displays a list of registrable devices, information indicating a group associated with each registrable device, and a registration/setup button 2401 on the device registration/setup screen 2311. The registration/setup button 2401 is an example a graphical representation for executing registration of a particular application and various settings in a registrable device. At this time, a display area for displaying each group name as a setup group is displayed and a pull-down key is arranged beside each group name on the device registration/setup screen 2311. Among a plurality of groups, a group for which selection is accepted can be associated with the registrable device. By operating the pull-down key, the administrator can select a group to be associated with the registrable device. For example, in a case where the pull-down key of the "GROUP A" is operated, the "GROUP B" and the "GROUP C" are displayed in a selectable manner. Thus, the administrator can select a desired group among the groups "A, B, and C." Accordingly, the administrator can register the particular application and the various settings associated with the selected group in the registrable device. For example, among all the groups stored in the group information management table, only a group, for which it is determined in S23-2 that the registration device matches an applicable device type in which an application and a setting can be registered, may be displayed in a selectable manner as a setup group.

Figure 15:
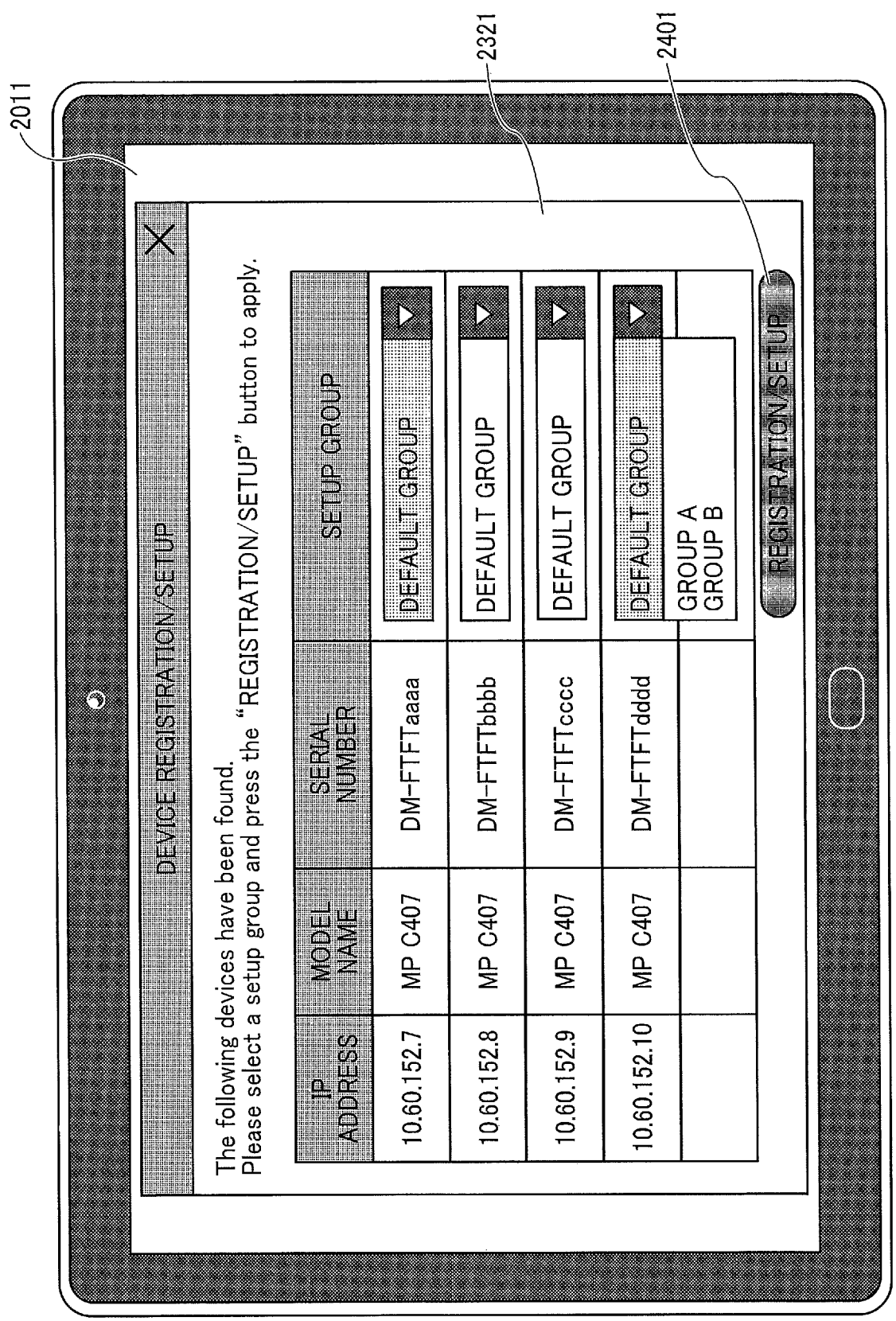
FIG. 15 is a diagram illustrating another example of a display screen in selecting a setup group according to one embodiment.

FIG. 15 is a diagram illustrating an example of a display screen in selecting a setup group according to the present embodiment. In the state illustrated in FIG. 8, in a case where an operation to the device registration/setup button 2022 is received by the operation receiving unit 22, the display control unit 24 displays a device registration/setup screen 2321 (another dialog screen) laid over the device list screen 2011 displayed on the display 206. In addition, the display control unit 24 displays the registration/setup button 2401 on the device registration/setup screen 2321. At this time, a display area for displaying a default group name as a setup group is displayed and a pull-down key is arranged beside each default group name on the device registration/setup screen 2321. By operating the pull-down key, the administrator can select a group to be associated with the registrable device. For example, in a case where the pull-down key of the default group corresponding to the IP address "10.60.152.10" is operated, the "GROUP A" and the "GROUP B" are displayed in a selectable manner. The administrator can select a desired group among the "DEFAULT GROUP" and the groups "A and B." Accordingly, the administrator can register the particular application and the various settings associated with the selected group in the registerable device. The screen illustrated in FIG. 15 is an example of a screen displaying a list of default groups.

Figure 16:
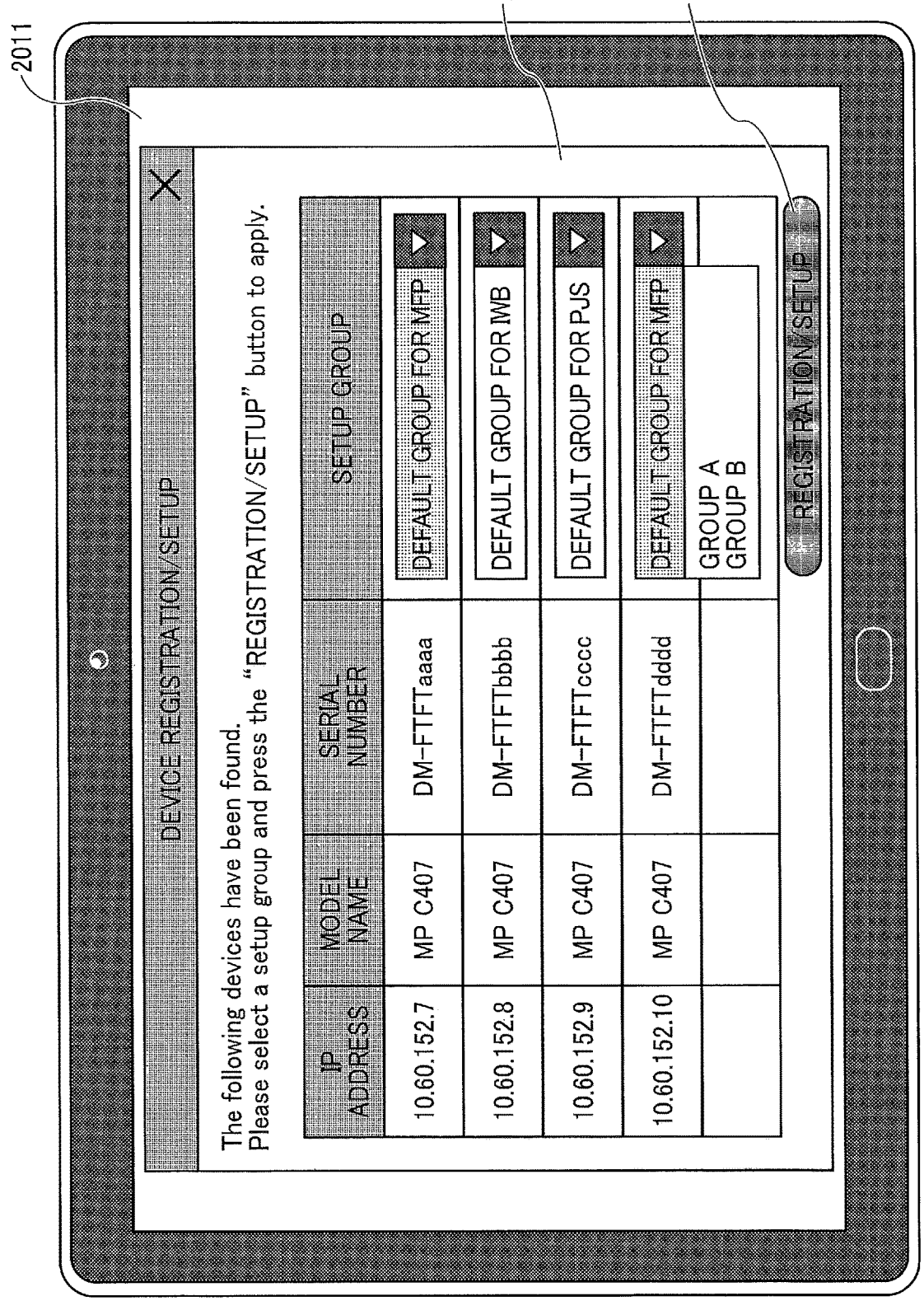
FIG. 16 is a diagram illustrating another example of a display screen in selecting a setup group according to one embodiment.

FIG. 16 is a diagram illustrating another example of a display screen in selecting a setup group according to the present embodiment. In the state illustrated in FIG. 8, in a case where an operation to the device registration/setup button 2022 is received by the operation receiving unit 22, the display control unit 24 displays a device registration/setup screen 2331 (another dialog screen) laid over the device list screen 2011 displayed on the display 206. In addition, the display control unit 24 displays the registration/setup button 2401 on the device registration/setup screen 2341. At this time, a display area for displaying a default group name by device type as a setup group is displayed and a pull-down key is arranged beside each default group name by device type on the device registration/setup screen 2331. By operating the pull-down key, the administrator can select a group to be associated with the registrable device. For example, in a case where the pull-down key of the "DEFAULT GROUP FOR MFP" corresponding to the IP address "10.60.152.10" is operated, the "GROUP A" and the "GROUP B" are displayed in a selectable manner. The administrator can select a desired group among the "DEFAULT GROUP FOR MFP" and the groups "A and B." Accordingly, the administrator can register the particular application and the various settings associated with the selected group in the registerable device. The screen illustrated in FIG. 16 is an example of a screen displaying a list of a default group.

Figure 17:
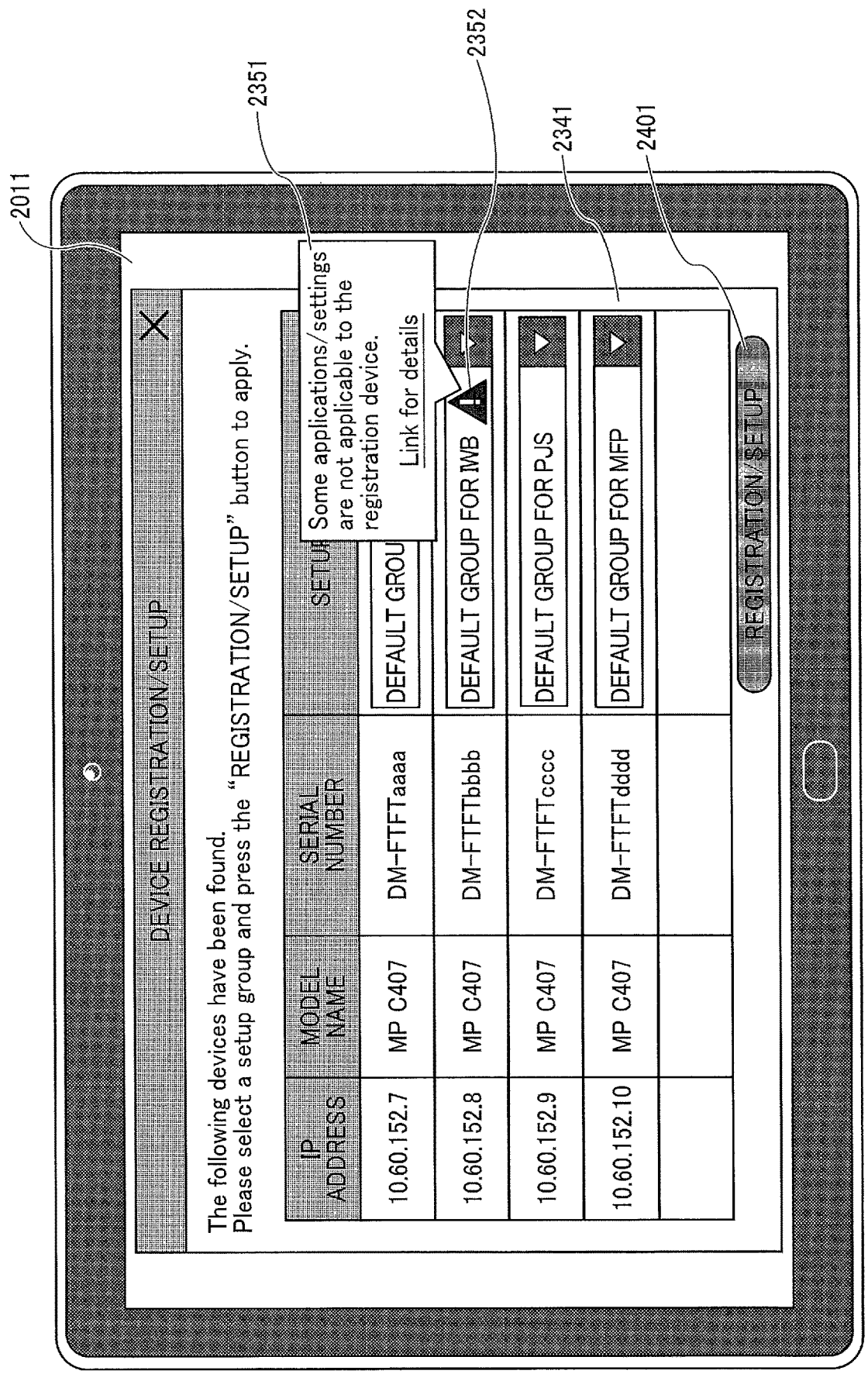
FIG. 17 is a diagram illustrating another example of a display screen in selecting a setup group according to one embodiment.

FIG. 17 is a diagram illustrating another example of a display screen in selecting a setup group according to the present embodiment. In the state illustrated in FIG. 8, in a case where an operation to the device registration/setup button 2022 is received by the operation receiving unit 22, the display control unit 24 displays a device registration/setup screen 2341 (another dialog screen) laid over the device list screen 2011 displayed on the display 206. In addition, the display control unit 24 displays the registration/setup button 2401 on the device registration/setup screen 2341. At this time, a display area for displaying a group name by device type as a setup group is displayed and a pull-down key is arranged beside each default group name by device type on the device registration/setup screen 2341. By operating the pull-down key, the administrator can select a group corresponding to the operated pull-down key to be associated with the registrable device among groups by device type.

In FIG. 17, an exclamation mark 2352 and a balloon 2351 indicating the alert message generated by the display control unit 24 in the processing of S23-3 are displayed near the default group name of the "DEFAULT GROUP FOR IWB" corresponding to the IP address "10.60.152.8." The balloon 2351 at this time has a content such as "Some applications/settings are not applicable to the registration device." Further, a link button for checking a detailed content is displayed in the balloon. The screen illustrated in FIG. 17 is an example of an alert screen indicating that registration of a particular application and various settings are not feasible in the registration device 4.

Figure 18:
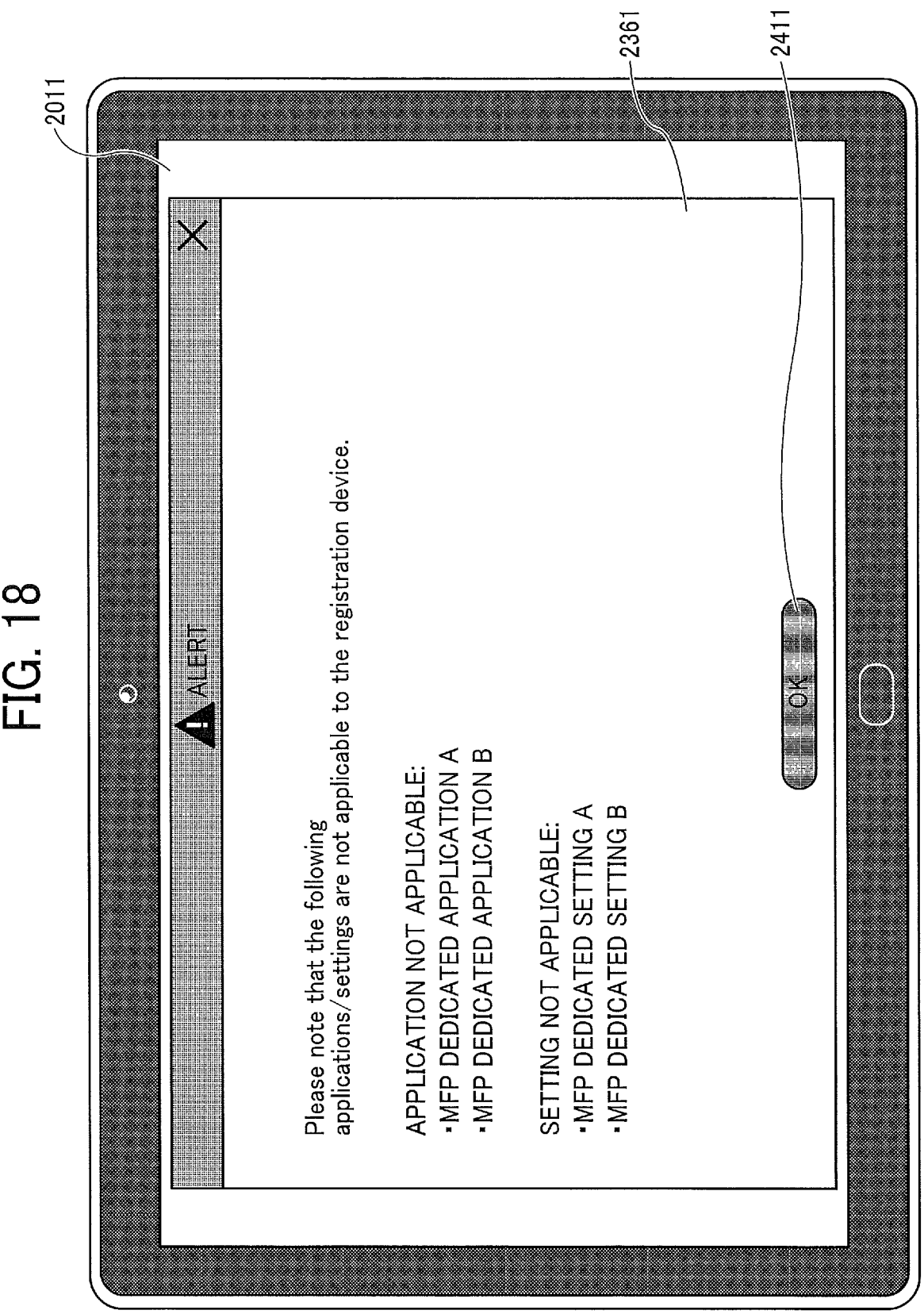
FIG. 18 is a diagram illustrating an example of a display screen of alert in selecting a setup group according to one embodiment.

FIG. 18 is a diagram illustrating an example of a display screen of alert in selecting a setup group according to the present embodiment. The display screen of alert is, for example, an alert screen that is displayed by operating the link button in the balloon illustrated in FIG. 17. The display control unit 24 displays an alert screen 2361 instead of the device registration/setup screen 2341. A summary of unregistrable states determined in S23-3 is displayed on the alert screen 2361. For example, unregistrable applications and unregistrable settings are listed on the alert screen 2361. Note that the display form is not limited to the above-described form and may be changed as appropriate for a display content and visibility on display. The display control unit 24 also displays an "OK" button 2411 on the alert screen 2361. The administrator (user) can transition to another screen by operating the "OK" button 2411. The screen illustrated in FIG. 18 is an example of an alert screen indicating that registration cannot be performed when the registration device 4 is in a state in which a particular application and various settings cannot be registered.

Device Registration Setup Execution Processing

Returning again to FIG. 11, the storing and reading unit 29 reads a registered application and a registration setting of a group associated with the registration device 4 (S24). Specifically, the storing and reading unit 29 searches the registered application information management DB 2002 (see FIG. 5B) using the application identifier (A001, A002, etc.) as a search key to read the application name corresponding to the application identifier. Further, the storing and reading unit 29 searches the registration setting information management DB 2003 (see FIG. 5C) using the setting identifier (S001, S002, etc.) as a search key to read the setting name and the input parameter corresponding to the setting identifier. For example, in a case where the "GROUP A" is selected as the setup group of the registrable device corresponding to the IP address "10.60.152.7" and then the registration/setup button 2401 is operated on the device registration/setup screen 2311 illustrated in FIG. 14, the storing and reading unit 29 specifies the application identifier and the setting identifier of the "GROUP A" in the group information management table and reads an application name corresponding to the specified application identifier, and a setting name and an input parameter corresponding to the specified setting identifier. In a case where a group is associated with a plurality of registrable devices on the device registration/setup screen 2311, the above-described processing is performed by the unit of the group associated with the plurality of the registrable devices.

Subsequently, the transmission and reception unit 21 performs a device registration setup (S25). Specifically, the transmission and reception unit 21 collectively transmits, to the communication management apparatus 3, the device identifier of each registration device 4 and the registration setting information including the application name, the setting name, and the input parameter corresponding to the device identifier of each registration device 4 read in S23 and S24 in association with one another. In other words, the transmission and reception unit 21 collectively transmits, to the communication management apparatus 3, the registration setting information that is set for each particular group based on the above-described registrable device information and is used for a registrable device to perform registration. The transmission processing in S25 is processing for transmitting the registration setting information set in response to an operation to the above-described registration/setup button 2401 (registration execution unit) to the communication management apparatus. Accordingly, the transmission and reception unit 31 of the communication management apparatus 3 receives the registration setting information transmitted by the information processing apparatus 2. For example, in a case where the "GROUP A" is associated with the setup group of the registerable device corresponding to the IP address "10.60.152.7," the transmission and reception unit 21 transmits, to the communication management apparatus 3, the device identifier of the registerable device, and the application name, the setting name, and the input parameter each corresponding to the application identifier and the setting identifier of the "GROUP A" in association with each other.

In response to receiving the registration setting information, the storing and reading unit 39 of the communication management apparatus 3 updates the registration state corresponding to the device identifier stored in the registration information management DB 3001 (see FIG. 5E) to be "REGISTERED" (S26).

After updating the registration state to the latest state, the transmission and reception unit 31 performs the device registration setup for the registration devices 4 in which a particular application and various settings are to be registered (S27). Specifically, the transmission and reception unit 31 transmits the registration setting information transmitted by the information processing apparatus 2 to the registration devices 4 that in which the particular application and the various settings are to be registered. Accordingly, the transmission and reception unit 41 of each of the registration devices 4 receives the registration setting information transmitted by the communication management apparatus 3. The registration setting information at this time includes the device identifier, the application name, the setting name, and the input parameter of each of the registration devices 4 described above. That is, after the registration state corresponding to the device identifier of the registrable device included in the registration setting information transmitted by the information processing apparatus 2 is registered, the transmission and reception unit 31 transmits the registration setting information to the one or more registrable devices. For example, in a case where the "GROUP A" is associated with the setup group of the registerable device corresponding to the IP address "10.60.152.7," the transmission and reception unit 31 transmits the registration setting information including the application name, the setting name, and the input parameter corresponding to the application identifier and the setting identifier of the "GROUP A" to the registration device 4 corresponding to the IP address "10.60.152.7."

The one or more registrable devices that have received the registration setting information among the registration devices 4 perform device setup (S28). That is, the registration unit 46 of the registrable device registers a particular application and various settings based on the received registration setting information. At this time, the registerable device may acquire and install a plurality of software specified for the device type thereof from a software management server separately managed by the communication system 1. For example, the registration device 4 can download and install a program from the software management server based on the information specifying an application such as an application name included in the registration setting information acquired from the communication management apparatus 3. Further, based on the information for specifying an application included in the registration setting information, a setting may be performed so that a web application provided by an external server can be used from a browser of the registration device 4. However, the present disclosure is not limited thereto, and any introduction processing may be used as long as the introduction processing is performed to enable an application specified by the registration setting information to be used in the registration device 4. Further, the registration device 4 can write the setting name and the input parameter included in the registration setting information acquired from the communication management apparatus 3 into a particular storage area of the registration device 4. As described above, one or more of the registration devices 4 are the registrable device.

After the device setup is completed, the transmission and reception unit 41 of each of the registration devices 4 transmits success or failure of the device registration setup to the communication management apparatus 3 (S29). Accordingly, the transmission and reception unit 31 of the communication management apparatus 3 receives the success or failure of the device registration setup transmitted by the registration devices 4.

Further, the transmission and reception unit 31 that has received the success or failure of the device registration setup of the communication management apparatus 3 transmits (transfers) the success or failure of the device registration setup to the information processing apparatus 2 (S30). Accordingly, the transmission and reception unit 21 of the information processing apparatus 2 receives the success or failure of the device registration setup transmitted (transferred) by the communication management apparatus 3.

In the communication system according to the present embodiment, for example, in performing the above-described processing of S16 and S25, another apparatus or the like may exist between the information processing apparatus 2 and the communication management apparatus 3. In other words, various types of information (data) transmitted and received between the information processing apparatus 2 and the communication management apparatus 3 may be transmitted and received via another apparatus. The above-described configuration and processing method may also be applied to the other processing steps between the information processing apparatus 2 and the communication management apparatus 3.

Further, in the communication system according to the present embodiment, for example, in performing the above-described processing of S27 and S29, another apparatus or the like may exist between the communication management apparatus 3 and the registration device 4. In other words, various types of information (data) transmitted and received between the communication management apparatus 3 and the registration device 4 may be transmitted and received via another apparatus. The above-described configuration and processing method may also be applied to the other processing steps between the communication management apparatus 3 and the registration device 4.

Further, the above-described processing of S21 to S27 performed between the information processing apparatus 2 and the communication management apparatus 3 may be performed only by the information processing apparatus 2 or may be performed only by the communication management apparatus 3. Furthermore, the functions of the information processing apparatus 2 and the communication management apparatus 3 may be performed by a single apparatus (server).

As described above, according to the present embodiment, the information processing apparatus 2 receives (S16) the registerable device information transmitted by the communication management apparatus 3. The registrable device information is information of a registerable device among the registration devices 4, in which a particular application and various settings can be registered. The information processing apparatus 2 also transmits (S25), to the communication management apparatus 3, the registration setting information that is set for each particular group based on the registrable device information and is used for the registrable device to perform registration. Thereafter, one or more registrable devices register the particular application and the various settings based on the registration setting information received from the communication management apparatus 3 (S28). Accordingly, in a case where an application and various settings are registered in the registration devices 4, the communication system 1 allows an administrator who performs registration of a particular application and various settings to recognize in advance whether or not the particular application and the various settings can be registered in each of the registration devices 4, resulting in reduction of time and effort in performing registration by the administrator.

Further, it is assumed that an administrator who performs registration of a particular application and various settings using the information processing apparatus 2 is involved in registration of the particular application and the various settings for the registration devices 4. In this case, the administrator can perform such registration to the registration devices 4 by simply performing in advance the registration of the particular application and the various settings classified by group using the information processing apparatus 2, resulting in further reduction of time and effort in performing registration by the administrator.

Variation of Embodiment

Next, a description is given of a variation of the embodiment. Note that, since a system configuration, hardware resources, and a functional configuration for implementing the variation of the embodiment are substantially the same as the contents described in the first embodiment, description thereof is omitted.

In the variation of the embodiment, the device management application stored in the storing unit 2000 of the information processing apparatus 2 in the first embodiment is managed by another server included in the communication system 1. In this case, the device management application managed by the other server may be provided as a web application that is browsed via a browser. In such a configuration, a function of the device management application and a rest of other functions of the information processing apparatus 2 are operated separately.

As described above, according to the present variation, in addition to the advantage achieved by the first embodiment, there is no need to manage applications by the information processing apparatus 2 and various databases (DBs) managed in association with the applications. Thus, a memory capacity is saved and processing for other functions is prioritized.

The functions of the embodiments of the present disclosure can be implemented by a computer executable program described in a legacy programming language such as an assembler, C, C++, C#, and Java (registered trademark), or an object-oriented programming language. The program to implement the functions in each embodiment can be distributed via a telecommunication line.

Further, the program for executing the functions of the embodiments of the present disclosure can be stored, for distribution, on a readable recording medium such as a ROM, an electrically erasable programmable read-only memory (EEPROM), an erasable programmable read-only memory (EPROM), a flash memory, a flexible disk (FD), a CD-ROM, a DVD-ROM, a DVD-RAM, a DVD-RW, a BLU-RAY disc, an SD card, a magneto-optical disc (MO), and etc.

Each function of the embodiments described above can be implemented by one processing circuit or a plurality of processing circuits. Here, the "processing circuit or circuitry" in the present disclosure includes a programmed processor to execute each function by software, such as a processor implemented by an electronic circuit and a device. The device refers to, for example, a processor and an application specific integrated circuit (ASIC), a digital signal processor (DSP), a field programmable gate array (FPGA), a system on a chip (SOC), a graphics processing unit (GPU), and conventional circuit components arranged to perform the recited functions.

Although the communication management system, the information processing apparatus, the information processing method, and the program according to embodiments of the present disclosure have been described above, the above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In one aspect, an information processing apparatus includes circuitry to: perform a registration setting for performing registration of a particular application in one or more registration object devices, receive registerable device information transmitted by a communication management apparatus, the registrable device information including a plurality of registerable devices in which the particular application and various settings are registrable among a plurality of registration object devices, and transmit registration setting information that is used by the plurality of registerable devices to perform registration of the particular application and the various settings to the communication management apparatus, the registration setting information being set for each particular group based on the registerable device information.

The invention claimed is:

1. A communication system comprising:
   an infoiiiiation processing apparatus,
   a plurality of devices; and
   a communication management apparatus that is implemented by a computer including a processor and a memory and configured to communicate with the information processing apparatus and each of the plurality of devices, the information processing apparatus including first circuitry configured to:
receive registrable device information transmitted by the communication management apparatus, the registrable device information indicating one or more registrable devices, among the plurality of devices, in which a particular application and particular settings are registrable;
transmit, to the communication management apparatus, registration setting information to be used for registering the particular application and the particular settings, the registration setting information being set for a particular group of a plurality of groups based on the registrable device information;
display a graphical representation for executing registration of the particular application and the particular settings in each of the one or more registrable devices, and further display a list of a default group representing a group in which each item of the particular group, the particular application, and the particular settings are set in advance among the plurality of groups, and
transmit the registration setting information set in accordance with an operation to the graphical representation to the communication management apparatus, each of the one or more devices including second circuitry configured to:
receive the registration setting information from the communication management apparatus; and
register the particular application and the particular settings based on the registration setting information.

2. The communication system according to claim 1, wherein the communication management apparatus includes third circuitry configured to, in response to of a registration state corresponding to a device identifier of each of the one or more registrable devices included in the registration setting information transmitted by the information processing apparatus, transmit the registration setting information to each of the one or more registrable devices.

3. The communication system according to claim 2, wherein the first circuitry of the information processing apparatus is further configured to determine whether or not the particular application and the particular settings are registrable in each of the plurality of devices based on the device identifier, an application identifier for identifying the particular application, and a setting identifier for identifying the particular settings.

4. The communication system according to claim 1, wherein the first circuitry of the information processing apparatus is further configured to display a list screen including a list of the particular application and the particular settings belonging to the particular group.

5. The communication system according to claim 4, wherein the first circuitry of the information processing apparatus is further configured to display another screen for inputting each item of the particular group, the particular application, and the particular settings displayed on the list screen.

6. The communication system according to claim 1, wherein the first circuitry of the information processing apparatus is further configured to, in a case where the particular application and the particular settings are not registrable in one or more of the plurality of devices, display an alert message indicating that registration is not executable.

7. The communication system according to claim 1, wherein the first circuitry of the communication management apparatus is further configured to:
determine a propriety of registration of each of the plurality of devices based on device information including identification information of the device transmitted by the device; and
transmit the registrable device information indicating a result of determination of the propriety of registration to the information processing apparatus.

8. An information processing method for registering a particular application in a plurality of devices, the method comprising:
receiving, by a first circuitry included in an information processing apparatus, registrable device information being transmitted by a communication management apparatus that communicates with the plurality of devices, the registrable device information indicating one or more registrable devices, among the plurality of devices, in which the particular application and particular settings are registrable;
transmitting, by the first circuitry, to the communication management apparatus, registration setting information set for a particular group of a plurality of groups based on the registrable device information to be used for registering the particular application and the particular settings, the registration setting information being set for a particular group of a plurality of groups based on the registrable device information;
displaying, by the first circuitry, a graphical representation for executing registration of the particular application and the particular settings in each of the one or more registrable devices, and further displaying a list of a default group representing a group in which each item of the particular group, the particular application, and the particular settings are set in advance among the plurality of groups;
transmitting, by the first circuitry, the registration setting information set in accordance with an operation to the graphical representation to the communication management apparatus,
receiving, by a second circuitry included in each of the one or more devices, the registration setting information from the communication management apparatus; and
registering, by the second circuitry, the particular application and the particular settings based on the registration setting information.

9. A non-transitory recording medium storing a plurality of program codes which, when executed by one or more processors, causes the processors to perform a method, the method comprising:
receiving, by a first circuitry included in an information processing apparatus, registrable device information being transmitted by a communication management apparatus that communicates with a plurality of devices, the registrable device information indicating one or more registrable devices, among the plurality of devices, in which a particular application and particular settings are registrable;
transmitting, by the first circuitry, to the communication management apparatus, registration setting information set for a particular group of a plurality of groups based on the registrable device information to be used for registering the particular application and the particular settings, the registration setting information being set for a particular group of a plurality of groups based on the registrable device information;

displaying, by the first circuitry, a graphical representation for executing registration of the particular application and the particular settings in each of the one or more registrable devices, and further displaying a list of a default group representing a group in which each item of the particular group, the particular application, and the particular settings are set in advance among the plurality of groups, transmitting, by the first circuitry, the registration setting information set in accordance with an operation to the graphical representation to the communication management apparatus, receiving, by a second circuitry included in each of the one or more devices, the registration setting information from the communication management apparatus, and registering, by the second circuitry, the particular application and the particular settings based on the registration setting information.

* * * * *